US012450405B2

(12) United States Patent
Bortolato

(10) Patent No.: US 12,450,405 B2
(45) Date of Patent: Oct. 21, 2025

(54) OPTIMIZING PORT LOCATIONS FOR AN INVERSE-DESIGNED DEVICE

(71) Applicant: X Development LLC, Mountain View, CA (US)

(72) Inventor: Cyril Bortolato, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 940 days.

(21) Appl. No.: 17/586,370

(22) Filed: Jan. 27, 2022

(65) Prior Publication Data

US 2023/0237213 A1   Jul. 27, 2023

(51) Int. Cl.
| | |
|---|---|
| *G06F 7/48* | (2006.01) |
| *G06F 30/12* | (2020.01) |
| *G06F 30/18* | (2020.01) |
| *G06F 30/20* | (2020.01) |
| *H04B 10/077* | (2013.01) |
| *G06F 113/16* | (2020.01) |

(52) U.S. Cl.
CPC .............. *G06F 30/20* (2020.01); *G06F 30/12* (2020.01); *G06F 30/18* (2020.01); *H04B 10/0773* (2013.01); *H04B 10/0775* (2013.01); *G06F 2113/16* (2020.01)

(58) Field of Classification Search
CPC .. G02B 6/12007; G02B 6/125; G02B 6/2938; G06F 2113/16; G06F 30/12; G06F 30/18; G06F 30/20; G06F 30/392; G06F 30/398; H04B 10/0773; H04B 10/0775
See application file for complete search history.

(56) References Cited

U.S. PATENT DOCUMENTS

| | | | | |
|---|---|---|---|---|
| 5,757,658 A | * | 5/1998 | Rodman .............. | G06F 30/392 716/135 |
| 10,615,869 B1 | * | 4/2020 | Adolf ................. | H04B 10/0775 |

(Continued)

FOREIGN PATENT DOCUMENTS

WO    2021096647 A1    5/2021

OTHER PUBLICATIONS

Bourgeault, M., et al., "Automatic Transistor-Level Design and Layout of FPGAs", Final Report, The Edward S. Rogers Sr. Dept of Electrical and Computer Engineering University of Toronto, Toronto, Canada, Apr. 12, 2002, 108 pages.

(Continued)

*Primary Examiner* — Nithya J. Moll
(74) *Attorney, Agent, or Firm* — Christensen O'Connor Johnson Kindness PLLC

(57) ABSTRACT

Techniques for creating a design for a physical device are disclosed. A computing system receives a design specification. The design specification includes a design region, one or more ports, and a port location perimeter. The computing system determines an initial proposed design based on the design specification that includes the design region and a location for each port of the one or more ports within the port location perimeter. The computing system optimizes the design region of the initial proposed design to create an improved design region, and optimizes at least one location of a port of the one or more ports within the port location perimeter to create an improved proposed design.

18 Claims, 15 Drawing Sheets

(56) References Cited

U.S. PATENT DOCUMENTS

| | | | |
|---|---|---|---|
| 2016/0012176 A1* | 1/2016 | Liu | G02B 6/107 |
| | | | 716/112 |
| 2016/0171149 A1 | 6/2016 | Alloatti | |
| 2018/0189425 A1* | 7/2018 | Van Vaerenbergh | G06F 30/30 |
| 2021/0266088 A1 | 8/2021 | Lu et al. | |

OTHER PUBLICATIONS

Jackson, B., "Solving FPGA I/O pin assignment challenges", Nov. 19, 2008, EE Times, <https:www.eetimes.com/solving-fpga-i-o-pin-assignment-challenges/#> [retrieved Nov. 24, 2021], pp. 1-6.

International Search Report and Written Opinion mailed Mar. 28, 2023, in corresponding International Patent Application No. PCT/US2022/050948, 18 pages.

Song et al., "A six-port path-reconfigurable circulator based on Y-type plasma photonic crystal", Photonics and Nanostructures, Elsevier, Amsterdam, NL, vol. 41, Jun. 17, 2020, 5 pages.

\* cited by examiner

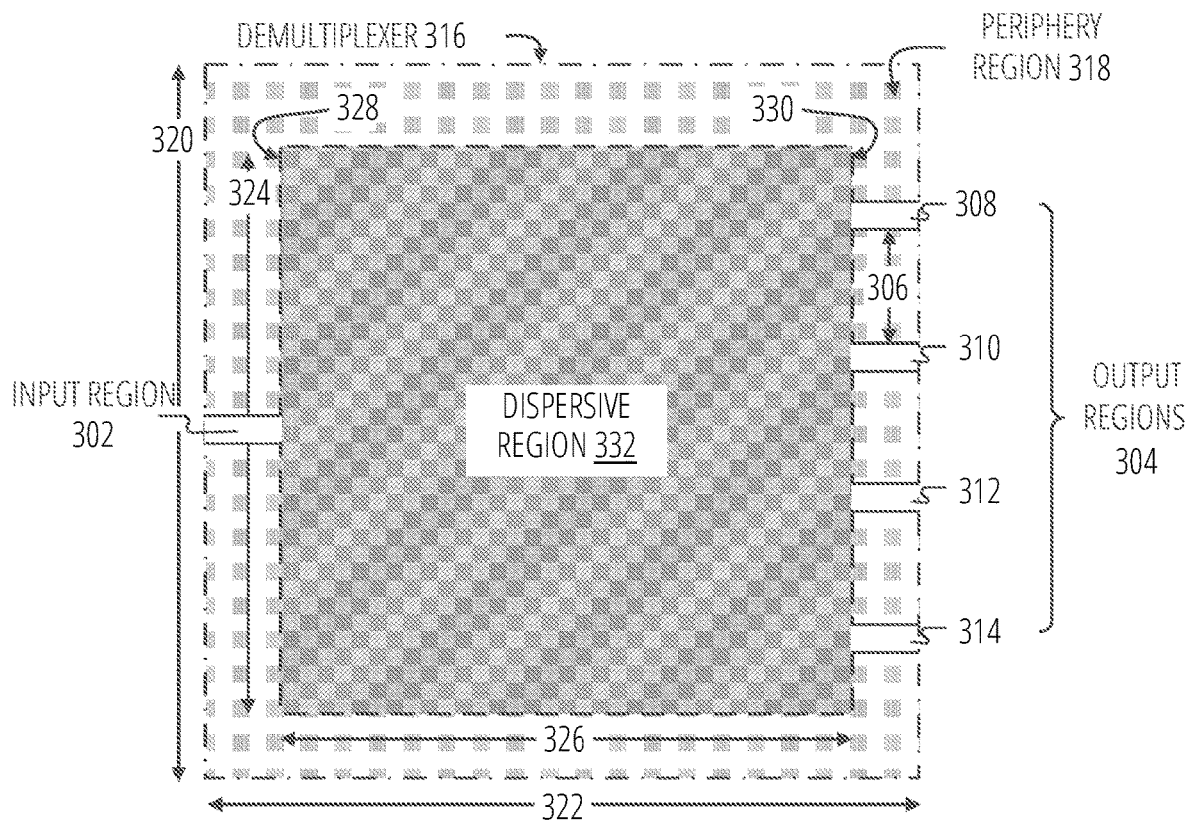
FIG. 3A
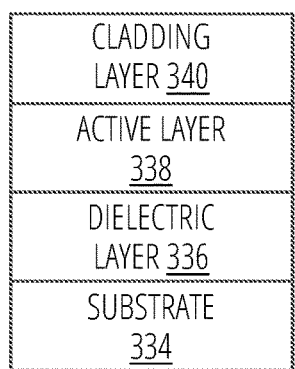 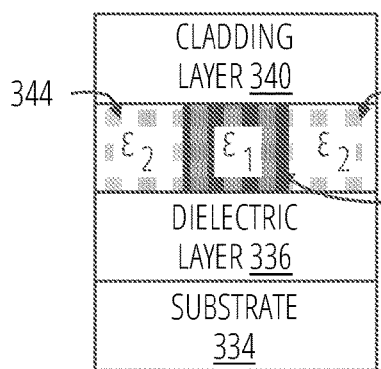 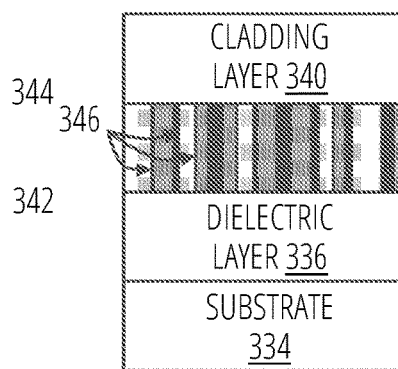
FIG. 3B       FIG. 3C       FIG. 3D

OPTIMIZING PORT LOCATIONS FOR AN INVERSE-DESIGNED DEVICE

TECHNICAL FIELD

This disclosure relates generally to photonic devices, and in particular but not exclusively, relates to optical multiplexers and demultiplexers.

BACKGROUND

Fiber-optic communication is typically employed to transmit information from one place to another via light that has been modulated to carry the information. For example, many telecommunication companies use optical fiber to transmit telephone signals, internet communication, and cable television signals. But the cost of deploying optical fibers for fiber-optic communication may be prohibitive. As such, techniques have been developed to more efficiently use the bandwidth available within a single optical fiber. Wavelength-division multiplexing is one such technique that bundles multiple optical carrier signals onto a single optical fiber using different wavelengths.

BRIEF SUMMARY

In some embodiments, a non-transitory computer-readable medium is provided. The computer-readable medium has logic stored thereon that, in response to execution by one or more processors of a computing system, causes the computing system to perform actions for creating a design for a physical device. The actions comprise receiving, by the computing system, a design specification, wherein the design specification includes a design region, one or more ports, and a port location perimeter; determining, by the computing system, an initial proposed design based on the design specification that includes the design region and a location for each port of the one or more ports within the port location perimeter; optimizing, by the computing system, the design region of the initial proposed design to create an improved design region; and optimizing, by the computing system, at least one location of a port of the one or more ports within the port location perimeter to create an improved proposed design.

In some embodiments, a computer-implemented method of creating a design for a physical device is provided. A computing system receives a design specification. The design specification includes a design region, one or more ports, and a port location perimeter. The computing system determines an initial proposed design based on the design specification that includes the design region and a location for each port of the one or more ports within the port location perimeter. The computing system optimizes the design region of the initial proposed design to create an improved design region. The computing system optimizes at least one location of a port of the one or more ports within the port location perimeter to create an improved proposed design.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

FIG. 3A-FIG. 3D illustrate different views of a non-limiting example embodiment of a photonic demultiplexer, according to various aspects of the present disclosure.

DETAILED DESCRIPTION

Figure 1:
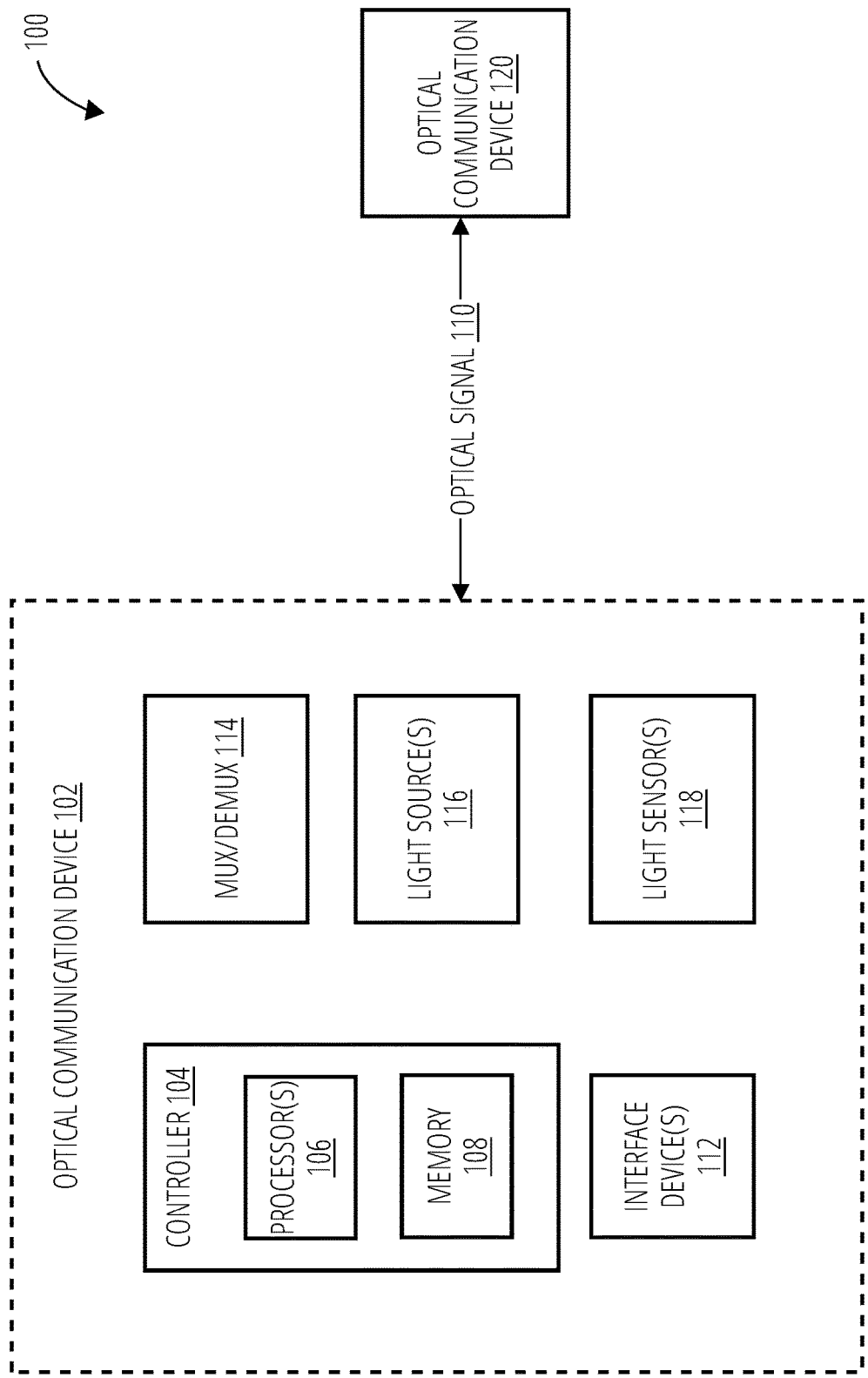
FIG. 1 is a functional block diagram illustrating a non-limiting example embodiment of a system for optical communication between two optical communication devices via an optical signal, according to various aspects of the present disclosure.

Embodiments of techniques for inverse design of physical devices are described herein, in the context of generating designs for photonic integrated circuits (including a multi-channel photonic demultiplexer). In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Wavelength division multiplexing and its variants (e.g., dense wavelength division multiplexing, coarse wavelength division multiplexing, and the like) take advantage of the bandwidth of optical fibers by bundling multiple optical carrier signals onto a single optical fiber. Once the multiple carrier signals are bundled together, they are transmitted from one place to another over the single optical fiber where they may be demultiplexed to be read out by an optical communication device. However, devices that decouple the carrier signals from one another remain prohibitive in terms of cost, size, and the like.

Moreover, design of photonic devices, such as those used for optical communication, are traditionally designed via conventional techniques sometimes determined through a simple guess and check method or manually-guided grid-search in which a small number of design parameters from pre-determined designs or building blocks are adjusted for suitability to a particular application. However, in actuality, these devices may have design parameters ranging from hundreds all the way to many billions or more, dependent on the device size and functionality. Thus, as functionality of photonic devices increases and manufacturing tolerances improve to allow for smaller device feature sizes, it becomes increasingly important to take full advantage of these improvements via optimized device design.

Described herein are embodiments of a photonic integrated circuit (e.g., a multi-channel photonic demultiplexer and/or multiplexer) having a design obtainable by an inverse design process. More specifically, techniques described in embodiments herein utilize gradient-based optimization in combination with first-principle simulations to generate a design from an understanding of the underlying physics that are expected to govern the operation of the photonic integrated circuit. It is appreciated in other embodiments, design optimization of photonic integrated circuits without gradient-based techniques may also be used. Advantageously, embodiments and techniques described herein are not limited to conventional techniques used for design of photonic devices, in which a small number of design parameters for pre-determined building blocks are adjusted based on suitability to a particular application. Rather, the first-principles based designs described herein are not necessarily dependent on human intuition and generally may result in designs which outstrip current state-of-the-art designs in performance, size, robustness, or a combination thereof. Further still, rather than being limited to a small number of design parameters due to conventional techniques, the embodiments and techniques described herein may provide scalable optimization of a nearly unlimited number of design parameters. It will also be appreciated that, though the design and fabrication of photonic integrated circuits is described throughout the present text, similar inverse design techniques may be used to generate designs for other types of physical devices.

FIG. 1 is a functional block diagram illustrating a system 100 for optical communication (e.g., via wavelength division multiplexing or other techniques) between optical communication device 102 and optical communication device 120 via optical signal 110, in accordance with various aspects of the present disclosure. More generally, optical communication device 102 is configured to transmit information by modulating light from one or more light sources into a multi-channel optical signal 110 (e.g., a singular optical signal that includes a plurality of distinct wavelength channels) that is subsequently transmitted from optical communication device 102 to optical communication device 120 via an optical fiber, a light guide, a wave guide, or other photonic device. Optical communication device 120 receives the multi-channel optical signal 110 and demultiplexes each of the plurality of distinct wavelength channels from the multi-channel optical signal 110 to extract the transmitted information. It is appreciated that in some embodiments optical communication device 102 and optical communication device 120 may be distinct and separate devices (e.g., an optical transceiver or transmitter communicatively coupled via one or more optical fibers to a separate optical transceiver or receiver). However, in other embodiments, optical communication device 102 and optical communication device 120 may be part of a singular component or device (e.g., a smartphone, a tablet, a computer, optical device, or the like). For example, optical communication device 102 and optical communication device 120 may both be constituent components on a monolithic integrated circuit that are coupled to one another via a waveguide that is embedded within the monolithic integrated circuit and is adapted to carry optical signal 110 between optical communication device 102 and optical communication device 120 or otherwise transmit the optical signal between one place and another.

In the illustrated embodiment, optical communication device 102 includes a controller 104, one or more interface device(s) 112 (e.g., fiber optic couplers, light guides, waveguides, and the like), a multiplexer (mux), demultiplexer (demux), or combination thereof (MUX/DEMUX 114), one or more light source(s) 116 (e.g., light emitting diodes, lasers, and the like), and one or more light sensor(s) 118 (e.g., photodiodes, phototransistors, photoresistors, and the like) coupled to one another. The controller includes one or more processor(s) 106 (e.g., one or more central processing units, application specific circuits, field programmable gate arrays, or otherwise) and memory 108 (e.g., volatile memory such as DRAM and SAM, non-volatile memory such as ROM, flash memory, and the like). It is appreciated that optical communication device 120 may include the same or similar elements as optical communication device 102, which have been omitted for clarity.

Controller 104 orchestrates operation of optical communication device 102 for transmitting and/or receiving optical signal 210 (e.g., a multi-channel optical signal having a plurality of distinct wavelength channels or otherwise). Controller 104 includes software (e.g., instructions included in memory 108 coupled to processor 106) and/or hardware logic (e.g., application specific integrated circuits, field-programmable gate arrays, and the like) that when executed by controller 104 causes controller 104 and/or optical communication device 102 to perform operations.

In one embodiment, controller 104 may choreograph operations of optical communication device 102 to cause light source(s) 116 to generate a plurality of distinct wavelength channels that are multiplexed via MUX/DEMUX 114 into a multi-channel optical signal 110 that is subsequently transmitted to optical communication device 120 via interface device 112. In other words, light source(s) 116 may output light having different wavelengths (e.g., 1271 nm, 1291 nm, 1311 nm, 1331 nm, 1506 nm, 1514 nm, 1551 nm, 1571, or otherwise) that may be modulated or pulsed via controller 104 to generate a plurality of distinct wavelength channels representative of information. The plurality of distinct wavelength channels are subsequently combined or otherwise multiplexed via MUX/DEMUX 114 into a multi-channel optical signal 110 that is transmitted to optical communication device 120 via interface device 112. In the same or another embodiment, controller 104 may choreograph operations of optical communication device 102 to cause a plurality of distinct wavelength channels to be demultiplexed via MUX/DEMUX 114 from a multi-channel optical signal 110 that is received via interface device 112 from optical communication device 120.

It is appreciated that in some embodiments certain elements of optical communication device 102 and/or optical communication device 120 may have been omitted to avoid obscuring certain aspects of the disclosure. For example, optical communication device 102 and optical communication device 120 may include amplification circuitry, lenses, or components to facilitate transmitting and receiving optical signal 110. It is further appreciated that in some embodiments optical communication device 102 and/or optical communication device 120 may not necessarily include all elements illustrated in FIG. 1. For example, in one embodiment optical communication device 102 and/or optical communication device 120 are passive devices that operate as an intermediary device that may passively multiplex a plurality of distinct wavelength channels into a multi-channel optical signal 110 and/or demultiplex a plurality of distinct wavelength channels from a multi-channel optical signal 110.

Figure 2A:
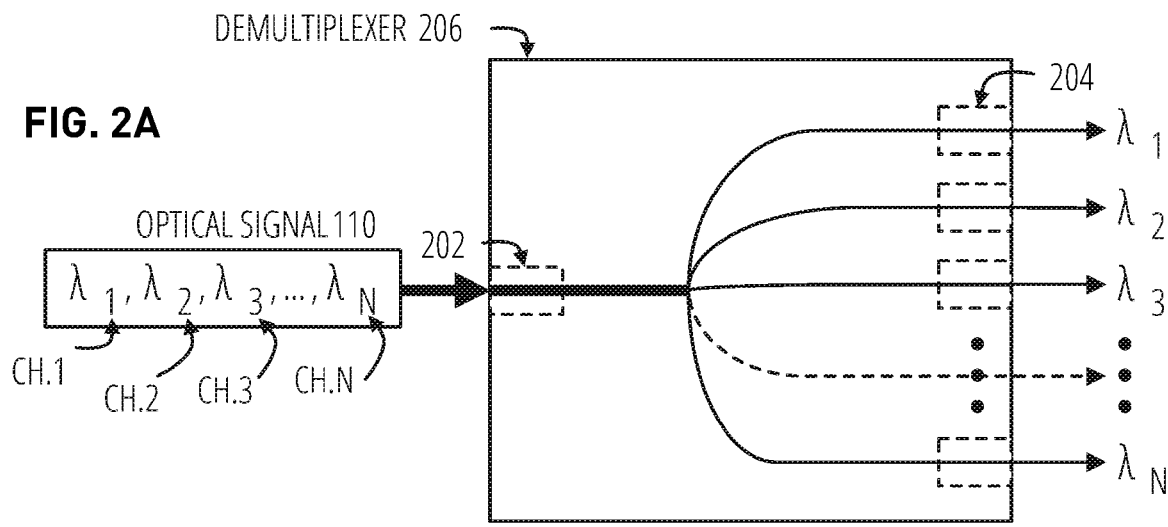
FIG. 2A and FIG. 2B respectively illustrate a non-limiting example embodiment of a demultiplexer and multiplexer, according to various aspects of the present disclosure.

FIG. 2A and FIG. 2A respectively illustrate an example demultiplexer 206 and multiplexer 208, in accordance with various aspects of the present disclosure. Demultiplexer 206 and multiplexer 208 are possible embodiments of MUX/DEMUX 114 illustrated in FIG. 1, and which may be part of an integrated photonic circuit, silicon photonic device, or otherwise As illustrated in FIG. 2A, demultiplexer 206 includes an input region 202 and a plurality of output regions 204. Demultiplexer 206 is configured to receive a multi-channel optical signal 110 that includes a plurality of distinct wavelength channels (e.g., Ch. 1, Ch. 2, Ch. 3, ... Ch. N, each having a center wavelength respectively corresponding to $\lambda$, $\lambda_2$, $\lambda_3$, ... $\lambda_N$) via input region 202 (e.g., a waveguide that may correspond to interface device 112 illustrated in FIG. 1) to optically separate each of the plurality of distinct wavelength channels from the multi-channel optical signal 110 and respectively guide each of the plurality of distinct wavelength channels to a corresponding one of a plurality of output regions 204 (e.g., a plurality of waveguides that may correspond to interface device(s) 112 illustrated in FIG. 1). More specifically, in the illustrated embodiment, each of the output regions 204 receives a portion of the multi-channel optical signal that corresponds to, or is otherwise representative of, one of the plurality of distinct wavelength channels that may be output as plurality of optical signals (e.g., $\lambda_1$, $\lambda_2$, $\lambda_3$, ... $\lambda_N$). The plurality of output regions 204 may each be coupled to a respective light sensor (e.g., corresponding to light sensor(s) 118 illustrated in FIG. 1), which may be utilized to convert the optical signals demultiplexed from the multi-channel optical signal 110 into electrical signals for further processing.

Figure 2B:
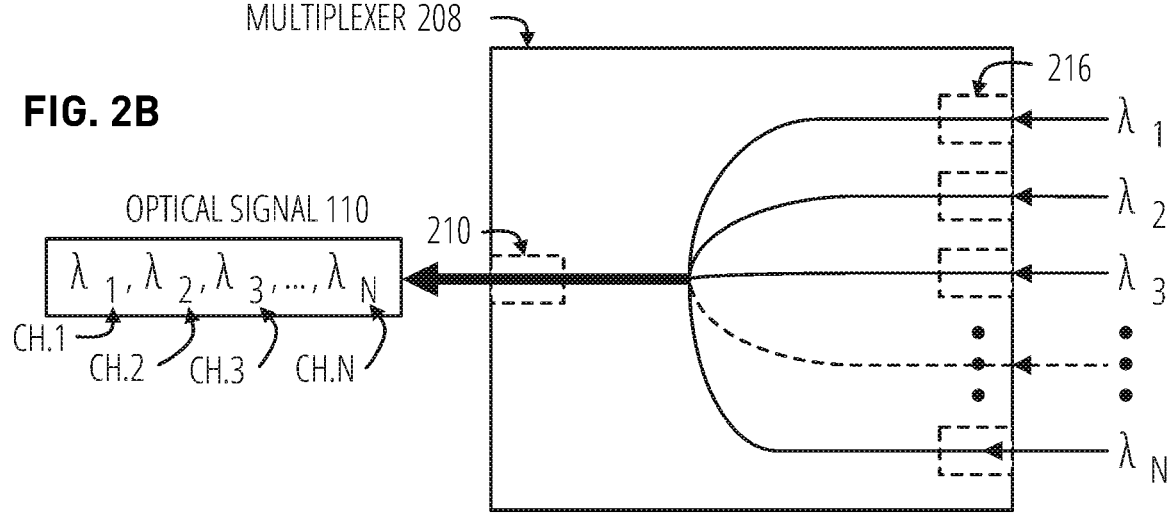

In the illustrated embodiment of FIG. 2B, multiplexer 208 includes a plurality of input regions 216 and an output region 210. Multiplexer 208 is configured to receive a plurality of distinct optical signals (e.g., $\lambda_1$, $\lambda_2$, $\lambda_3$, ... $\lambda_N$), each at a respective one of the plurality of input regions 216 (e.g., a plurality of waveguides that may correspond to interface device(s) 112 illustrated in FIG. 1). Multiplexer 208 is structured or otherwise configured to optically combine (i.e., multiplex) each of the plurality of distinct wavelength channels into a multi-channel optical signal 110 that is guided to output region 210 (e.g., a waveguide that may correspond to interface device 112 illustrated in FIG. 1). It is appreciated that in some embodiments, demultiplexer 206 illustrated in FIG. 2A and multiplexer 208 illustrated in FIG. 2B may be bidirectional such that each device may function as both a demultiplexer and multiplexer.

Figure 2C:
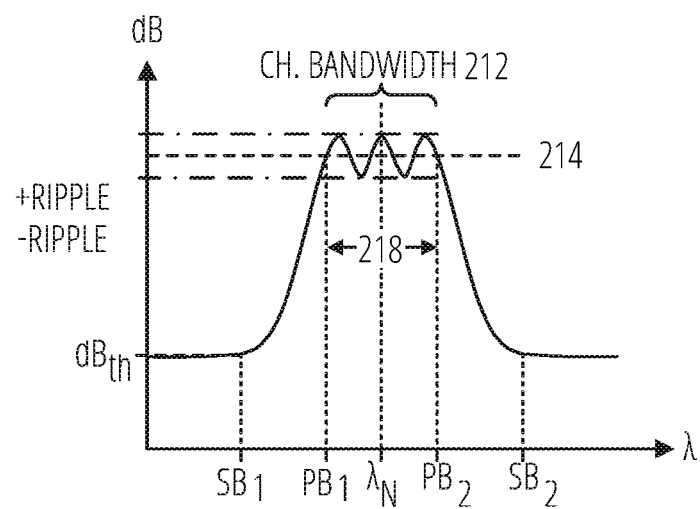
FIG. 2C illustrates a non-limiting example embodiment of a distinct wavelength channel of a multi-channel optical signal, according to various aspects of the present disclosure.

FIG. 2C illustrates an example distinct wavelength channel of a multi-channel optical signal (e.g., Ch. N is multi-channel optical signal 110 illustrated in FIG. 1, FIG. 2A, and FIG. 2B), in accordance with various aspects of the present disclosure. The example channel may be representative of an individual channel included in a plurality of distinct wavelength channels of the multi-channel optical signal that may be demultiplexed and/or multiplexed by demultiplexer 206 of FIG. 2A and/or multiplexer 208 of FIG. 2B. Each of the distinct wavelength channels may have different center wavelengths ($\lambda_N$) including at least one of 1271 nm, 1291 nm, 1311 nm, 1331 nm, 1506 nm, 1514 nm, 1551 nm, or 1571 nm, or otherwise. In the illustrated embodiment of FIG. 2C, the distinct wavelength channel has a channel bandwidth 212 of approximately 13 nm wide. However, in other embodiments the channel bandwidth may be different than 13 nm wide. Rather, the channel bandwidth may be considered a configurable parameter that is dependent upon the structure of MUX/DEMUX 114 of FIG. 1, demultiplexer 206 of FIG. 2A, and/or multiplexer 208 of FIG. 2B. For example, in some embodiments each of the plurality of distinct wavelength channels may share a common bandwidth that may correspond to 13 nm or otherwise. Referring back to FIG. 2C, the channel bandwidth 212 may be defined as the width of a passband region 218 (i.e., the region defined as being between $PB_1$ and $PB_2$). The passband region 218 may represent an approximate power transmission of a demultiplexer or multiplexer. It is appreciated that in some embodiments the passband region 218 may include ripple as illustrated in FIG. 2C, which corresponds to fluctuations within the passband region 218. In one or more embodiments, the ripple within the passband region around a central value 214 may be +/−2 dB or less, +/−1 dB or less, +/−0.5 dB or less, or otherwise. In some embodiments, the channel bandwidth 212 may be defined by the passband region 218. In other embodiments, the channel bandwidth 212 may be defined as the measured power above a threshold (e.g., $dB_{th}$). For example, demultiplexer 206 illustrated in FIG. 2A may optically separate channel N from multi-channel optical signal 110 and have a corresponding channel bandwidth for channel N equivalent to the range of wavelengths above a threshold value that are transmitted to the output region 204 mapped to channel N (i.e., $\lambda_N$). In the same or other embodiments, isolation of the channel (i.e., defined by channel bandwidth 212) may also be considered when optimizing the design. The isolation may be defined as a ratio between the passband region 218 and the stopband regions (e.g., regions less than $SB_1$ and greater than $SB_2$). It is further appreciated that transition band regions (e.g., a first transition region between $SB_1$ and $PB_1$ and a second transition region between $PB_2$ and $SB_2$) are exemplary and may be exaggerated for the purposes of illustration. In some embodiments, optimization of the design of the photonic demultiplexer may also include a target metric for a slope, width, or the like of the transition band regions.

FIG. 3A-FIG. 3D illustrate different views of an example photonic demultiplexer, in accordance with an embodiment of the present disclosure. Photonic demultiplexer 316 is one possible implementation of MUX/DEMUX 114 illustrated in FIG. 1 and demultiplexer 206 illustrated in FIG. 2A. It is further appreciated that while discussion henceforth may be directed towards photonic integrated circuits capable of demultiplexing a plurality of distinct wavelength channels from a multi-channel optical signal, that in other embodiments, a demultiplexer (e.g., demultiplexer 316) may also or alternatively be capable of multiplexing a plurality of distinct wavelength channels into a multi-channel optical signal, in accordance with embodiments of the present disclosure.

FIG. 3A illustrates a cross-sectional view of demultiplexer 316 along a lateral plane within an active layer defined by a width 320 and a length 322 of the demultiplexer 316. As illustrated, demultiplexer 316 includes an input region 302 (e.g., comparable to input region 202 illustrated in FIG. 2A), a plurality of output regions 304 (e.g., comparable to plurality of output regions 204 illustrated in FIG. 2A), and a dispersive region optically disposed between the input region 302 and plurality of output regions 304. The input region 302 and plurality of output regions 304 (e.g., output region 308, output region 310, output region 312, and output region 314) may each be waveguides (e.g., slab waveguide, strip waveguide, slot waveguide, or the like) capable of propagating light along the path of the waveguide. The dispersive region 332 includes a first material and a second material (see, e.g., FIG. 3D) inhomogeneously interspersed to form a plurality of interfaces that each correspond to a change in refractive index of the dispersive region 332 and collectively structure the dispersive region 332 to optically separate each of a plurality of distinct wavelength channels (e.g., Ch. 1, Ch. 2, Ch. 3, . . . Ch. N illustrated in FIG. 2A) from a multi-channel optical signal (e.g., optical signal 110 illustrated in FIG. 2A) and respectively guide each of the plurality of distinct wavelength channels to a corresponding one of the plurality of output regions 304 when the input region 302 receives the multi-channel optical signal. In other words, input region 302 is adapted to receive the multi-channel optical signal including a plurality of distinct wavelength channels and the plurality of output regions 304 are adapted to each receive a corresponding one of the plurality of distinct wavelength channels demultiplexed from the multi-channel optical signal via dispersive region 332.

Figure 4A:
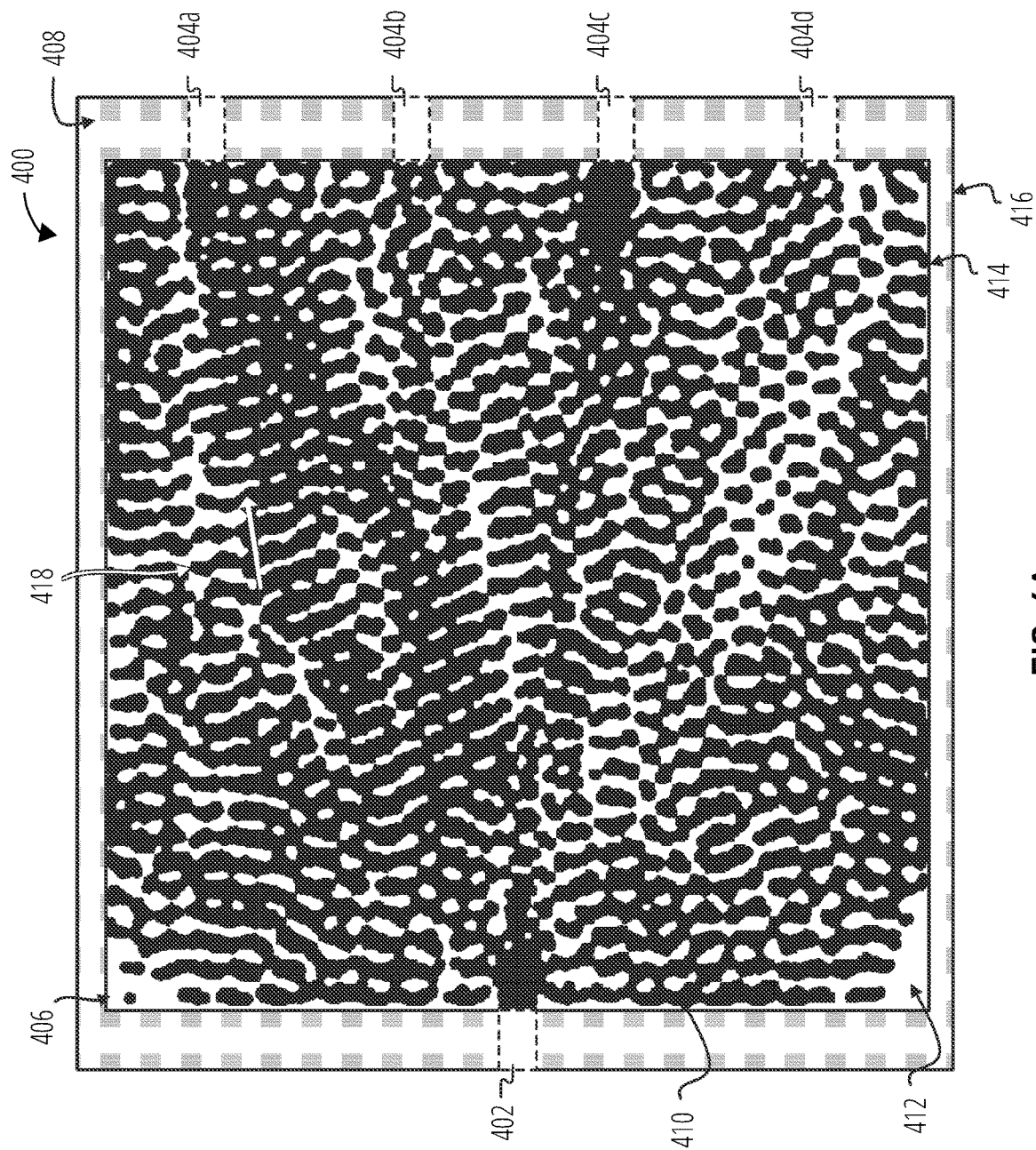
FIG. 4A and FIG. 4B illustrate a more detailed cross-sectional view of a dispersive region of a non-limiting example embodiment of a photonic demultiplexer, according to various aspects of the present disclosure.
Figure 4B:
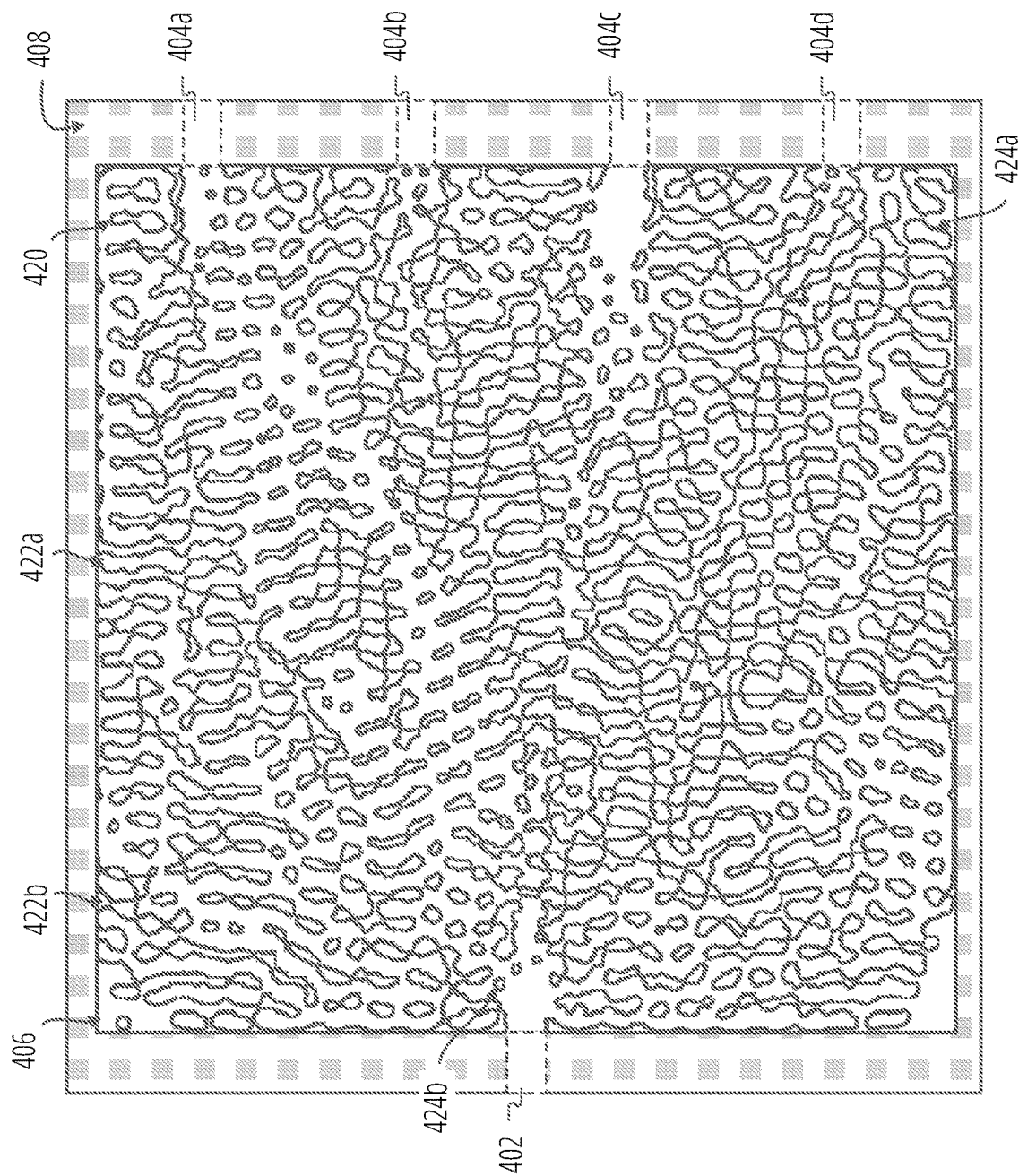

As illustrated in FIG. 3A, and more clearly shown in FIG. 3D and FIG. 4A-FIG. 4B, the shape and arrangement of the first and second material that are inhomogeneously interspersed create a plurality of interfaces that collectively form a material interface pattern along a cross-sectional area of dispersive region 332 that is at least partially surrounded by a periphery region 318 that includes the second material. In some embodiments periphery region 318 has a substantially homogeneous composition that includes the second material. In the illustrated embodiment, dispersive region 332 includes a first side 328 and a second side 330 that each interface with an inner boundary (i.e., the unlabeled dashed line of periphery region 318 disposed between dispersive region 332 and dashed-dotted line corresponding to an outer boundary of periphery region 318). First side 328 and second side 330 are disposed correspond to opposing sides of dispersive region 332. Input region 302 is disposed proximate to first side 328 (e.g., one side of input region 302 abuts first side 328 of dispersive region 332) while each of the plurality of output regions 304 are disposed proximate to second side 330 (e.g., one side of each of the plurality of output regions 304 abuts second side 330 of dispersive region 332).

In the illustrated embodiment each of the plurality of output regions 304 are parallel to each other one of the plurality of output regions 304. However, in other embodiments the plurality of output regions 304 may not be parallel to one another or even disposed on the same side (e.g., one or more of the plurality of output regions 304 and/or input region 302 may be disposed proximate to sides of dispersive region 332 that are adjacent to first side 328 and/or second side 330). In some embodiments adjacent ones of the plurality of output regions are separated from each other by a common separation distance when the plurality of output regions includes at least three output regions. For example, as illustrated adjacent output region 308 and output region 310 are separated from one another by distance 306, which may be common to the separation distance between other pairs of adjacent output regions.

As illustrated in the embodiment of FIG. 3A, demultiplexer 316 includes four output regions 304 (e.g., output region 308, output region 310, output region 312, output region 314) that are each respectively mapped (i.e., by virtue of the structure of dispersive region 332) to a respective one of four channels included in a plurality of distinct wavelength channels. More specifically, the plurality of interfaces of dispersive region 332, defined by the inhomogeneous interspersion of a first material and a second material, form a material interface pattern along a cross-sectional area of the dispersive region 332 (e.g., as illustrated in FIG. 3A, FIG. 4A, or FIG. 4B) to cause the dispersive region 332 to optically separate each of the four channels from the multi-channel optical signal and route each of the four channels to a respective one of the four output regions 304 when the input region 302 regions the multi-channel optical signal.

It is noted that the first material and second material of dispersive region 332 are arranged and shaped within the dispersive region such that the material interface pattern is substantially proportional to a design obtainable with an inverse design process, which will be discussed in greater detail later in the present disclosure. More specifically, in some embodiments, the inverse design process may include iterative gradient-based optimization of a design based at least in part on a loss function that incorporates a performance loss (e.g., to enforce functionality) and a fabrication loss (e.g., to enforce fabricability and binarization of a first material and a second material) that is reduced or otherwise adjusted via iterative gradient-based optimization to generate the design. In the same or other embodiment, other optimization techniques may be used instead of, or jointly with, gradient-based optimization. Advantageously, this allows for optimization of a near unlimited number of design parameters to achieve functionality and performance within a predetermined area that may not have been possible with conventional design techniques.

For example, in one embodiment dispersive region 332 is structured to optically separate each of the four channels from the multi-channel optical signal within a predetermined area of 35 µm×35 µm (e.g., as defined by width 324 and length 326 of dispersive region 332) when the input region 302 receives the multi-channel optical signal. In the same or another embodiment, the dispersive region is structured to accommodate a common bandwidth for each of the four channels, each of the four channels having different center wavelengths. In one embodiment the common bandwidth is approximately 13 nm wide and the different center wavelengths is selected from a group consisting of 1271 nm, 1291 nm, 1311 nm, 1331 nm, 1506 nm, 1514 nm, 1551 nm, and 1571 nm. In some embodiments, the entire structure of demultiplexer 316 (e.g., including input region 302, periphery region 318, dispersive region 332, and plurality of output regions 304) fits within a predetermined area (e.g., as defined by width 320 and length 322). In one embodiment the predetermined area is 35 µm×35 µm. It is appreciated that in other embodiments dispersive region 332 and/or demultiplexer 316 fits within other areas greater than or less than 35 µm×35 µm, which may result in changes to the structure of dispersive region 332 (e.g., the arrangement and shape of the first and second material) and/or other components of demultiplexer 316.

In the same or other embodiments the dispersive region is structured to have a power transmission of −2 dB or greater from the input region 302, through the dispersive region 332, and to the corresponding one of the plurality of output regions 304 for a given wavelength within one of the plurality of distinct wavelength channels. For example, if channel 1 of a multi-channel optical signal is mapped to output region 308, then when demultiplexer 316 receives the multi-channel optical signal at input region 302 the dispersive region 332 will optically separate channel 1 from the multi-channel optical signal and guide a portion of the multi-channel optical signal corresponding to channel 1 to output region 308 with a power transmission of −2 dB or greater. In the same or another embodiment, dispersive region 332 is structured such that an adverse power transmission (i.e., isolation) for the given wavelength from the input region to any of the plurality of output regions other than the corresponding one of the plurality of output regions is −30 dB or less, −22 dB or less, or otherwise. For example, if channel 1 of a multi-channel optical signal is mapped to output region 308, then the adverse power transmission from input region 302 to any other one of the plurality of output regions (e.g., output region 310, output region 312, output region 314) other than the corresponding one of the plurality of output regions (e.g., output region 308) is −30 dB or less, −22 dB or less, or otherwise. In some embodiments, a maximum power reflection from demultiplexer 316 of an input signal (e.g., a multi-channel optical signal) received at an input region (e.g., input region 302) is reflected back to the input region by dispersive region 332 or otherwise is −40 dB or less, −20 dB or less, −8 dB or less, or otherwise. It is appreciated that in other embodiments the power transmission, adverse power transmission, maximum power, or other performance characteristics may be different than the respective values discussed herein, but the structure of dispersive region 332 may change due to the intrinsic relationship between structure, functionality, and performance of demultiplexer 316.

FIG. 3B illustrates a vertical schematic or stack of various layers that are included in the illustrated embodiment of demultiplexer 316. However, it is appreciated that the illustrated embodiment is not exhaustive and that certain features or elements may be omitted to avoid obscuring certain aspects of the invention. In the illustrated embodiment, demultiplexer 316 includes substrate 334, dielectric layer 336, active layer 338 (e.g., as shown in the cross-sectional illustration of FIG. 3A), and a cladding layer 340. In some embodiments, demultiplexer 316 may be, in part or otherwise, a photonic integrated circuit or silicon photonic device that is compatible with conventional fabrication techniques (e.g., lithographic techniques such as photolithographic, electron-beam lithography and the like, sputtering, thermal evaporation, physical and chemical vapor deposition, and the like).

In one embodiment a silicon on insulator (SOI) wafer may be initially provided that includes a support substrate (e.g., a silicon substrate) that corresponds to substrate 334, a silicon dioxide dielectric layer that corresponds to dielectric layer 336, a silicon layer (e.g., intrinsic, doped, or otherwise), and a oxide layer (e.g., intrinsic, grown, or otherwise). In one embodiment, the silicon in the active layer 338 may be etched selectively by lithographically creating a pattern on the SOI wafer that is transferred to SOI wafer via a dry etch process (e.g., via a photoresist mask or other hard mask) to remove portions of the silicon. The silicon may be etched all the way down to dielectric layer 336 to form voids that may subsequently be backfilled with silicon dioxide that is subsequently encapsulated with silicon dioxide to form cladding layer 340. In one embodiment, there may be several etch depths including a full etch depth of the silicon to obtain the targeted structure. In one embodiment, the silicon may be 206 nm thick and thus the full etch depth may be 206 nm. In some embodiments, this may be a two-step encapsulation process in which two silicon dioxide depositions are performed with an intermediate chemical mechanical planarization used to yield a planar surface.

FIG. 3C illustrates a more detailed view of active layer 338 (relative to FIG. 3B) taken along a portion of periphery region 318 that includes input region 302 of FIG. 3A. In the illustrated embodiment, active layer 338 includes a first material 342 with a refractive index of $\varepsilon_1$ and a second material 344 with a refractive index of $\varepsilon_2$ that is different from $\varepsilon_1$. Homogenous regions of the first material 342 and the second material 344 may form waveguides or portions of waveguides that correspond to input region 302 and plurality of output regions 304 as illustrated in FIG. 3A and FIG. 3C.

FIG. 3D illustrates a more detailed view of active layer 338 (relative to FIG. 3B) taken along dispersive region 332. As described previously, active layer 338 includes a first material 342 (e.g., silicon) and a second material 344 (e.g., silicon dioxide) that are inhomogeneously interspersed to form a plurality of interfaces 346 that collectively form a material interface pattern. Each of the plurality of interfaces 346 that form the interface pattern correspond to a change in refractive index of dispersive region 332 to structure the dispersive region (i.e., the shape and arrangement of first material 342 and second material 344) to provide, at least in part, the functionality of demultiplexer 316 (i.e., optical separation of the plurality of distinct wavelength channels from the multi-channel optical signal and respective guidance of each of the plurality of distinct wavelength channels to the corresponding one of the plurality of output regions 304 when the input region 302 receives the multi-channel optical signal).

It is appreciated that in the illustrated embodiments of demultiplexer 316 as shown in FIG. 3A-FIG. 3D, the change in refractive index is shown as being vertically consistent (i.e., the first material 342 and second material 344 form interfaces that are substantially vertical or perpendicular to a lateral plane or cross-section of demultiplexer 316. However, in the same or other embodiments, the plurality of interfaces (e.g., interfaces 346 illustrated in FIG. 3D) may not be substantially perpendicular with the lateral plane or cross-section of demultiplexer 316.

FIG. 4A illustrates a more detailed cross-sectional view of a dispersive region of example photonic demultiplexer 400, in accordance with an embodiment of the present disclosure.

FIG. 4B illustrates a more detailed view of an interface pattern formed by the shape and arrangement of a first material 410 and a second material 412 for the dispersive region of the photonic demultiplexer 400 of FIG. 4A. Photonic demultiplexer 400 is one possible implementation of MUX/DEMUX 114 illustrated in FIG. 1, demultiplexer 206 illustrated in FIG. 2A, and demultiplexer 316 illustrated in FIG. 3A-FIG. 3D.

As illustrated in FIG. 4A and FIG. 4B, photonic demultiplexer 400 includes an input region 402, a plurality of output regions 404a-404d, and a dispersive region 406 optically disposed between input region 402 and plurality of output regions 404a-404d. Dispersive region 406 is surrounded, at least in part, by a peripheral region 408 that includes an inner boundary 414 and an outer boundary 416. It is appreciated that like named or labeled elements of photonic demultiplexer 400 may similarly correspond to like named or labeled elements of other demultiplexers described in embodiments of the present disclosure.

The first material 410 (i.e., black colored regions within dispersive region 406) and second material 412 (i.e., white colored regions within dispersive region 406) of photonic demultiplexer 400 are inhomogeneously interspersed to create a plurality of interfaces that collectively form material interface pattern 420 as illustrated in FIG. 4B. More specifically, an inverse design process that utilizes iterative gradient-based optimization, Markov Chain Monte Carlo optimization, or other optimization techniques combined with first principles simulations to generate a design that is substantially replicated by dispersive region 406 within a proportional or scaled manner such that photonic demultiplexer 400 provides the desired functionality. In the illustrated embodiment, dispersive region 406 is structured to optically separate each of a plurality of distinct wavelength channels from a multi-channel optical signal and respectively guide each of the plurality of distinct wavelength channels to a corresponding one of the plurality of output regions 404a-404d when the input region 402 receives the multi-channel optical signal. More specifically, the plurality of output regions 404a-404d are respectively mapped to wavelength channels having center wavelengths correspond to 1271 nm, 1291 nm, 1311 nm, and 1331 nm. In another embodiment, output regions 404a-404d are respectfully mapped to wavelength channels having center wavelengths that correspond to 1506 nm, 1514 nm, 1551 nm, and 1571 nm.

As illustrated in FIG. 4B, material interface pattern 420, which is defined by the black lines within dispersive region 406 and corresponds to a change in refractive index within dispersive region 406, includes a plurality of protrusions 422a-422b. A first protrusion 422a is formed of the first material 410 and extends from peripheral region 408 into dispersive region 406. Similarly, a second protrusion 422b is formed of the second material 412 and extends from peripheral region 408 into dispersive region 406. Further illustrated in FIG. 4B, dispersive region 406 includes a plurality of islands 424a-424b formed of either the first material 410 or the second material 412. The plurality of islands 424a-424b include a first island 424a that is formed of the first material 410 and is surrounded by the second material 412. The plurality of islands 424a-424b also includes a second island 424b that is formed of the second material 412 and is surrounded by the first material 410.

In some embodiments, material interface pattern 420 includes one or more dendritic shapes, wherein each of the one or more dendritic shapes are defined as a branched structure formed from first material 410 or second material 412 and having a width that alternates between increasing and decreasing in size along a corresponding direction. Referring back to FIG. 4A, for clarity, dendritic structure 418 is labeled with a white arrow having a black border. As can be seen, the width of dendritic structure 418 alternatively increases and decreases in size along a corresponding direction (i.e., the white labeled arrow overlaying a length of dendritic structure 418) to create a branched structure. It is appreciated that in other embodiments there may be no protrusions, there may be no islands, there may be no dendritic structures, or there may be any number, including zero, of protrusions, islands of any material included in the dispersive region 406, dendritic structures, or a combination thereof.

In some embodiments, the inverse design process includes a fabrication loss that enforces a minimum feature size, for example, to ensure fabricability of the design. In the illustrated embodiment of photonic demultiplexer 400 illustrated in FIG. 4A and FIG. 4B, material interface pattern 420 is shaped to enforce a minimum feature size within dispersive region 406 such that the plurality of interfaces within the cross-sectional area formed with first material 410 and second material 412 do not have a radius of curvature with a magnitude of less than a threshold size. For example, if the minimum feature size is 150 nm, the radius of curvature for any of the plurality of interfaces have a magnitude of less than the threshold size, which corresponds the inverse of half the minimum feature size (i.e., $^{1}/_{75}$ nm$^{-1}$). Enforcement of such a minimum feature size prevents the inverse design process from generating designs that are not fabricable by considering manufacturing constraints, limitations, and/or yield. In the same or other embodiments, different or additional checks on metrics related to fabricability may be utilized to enforce a minimum width or spacing as a minimum feature size.

Figure 5:
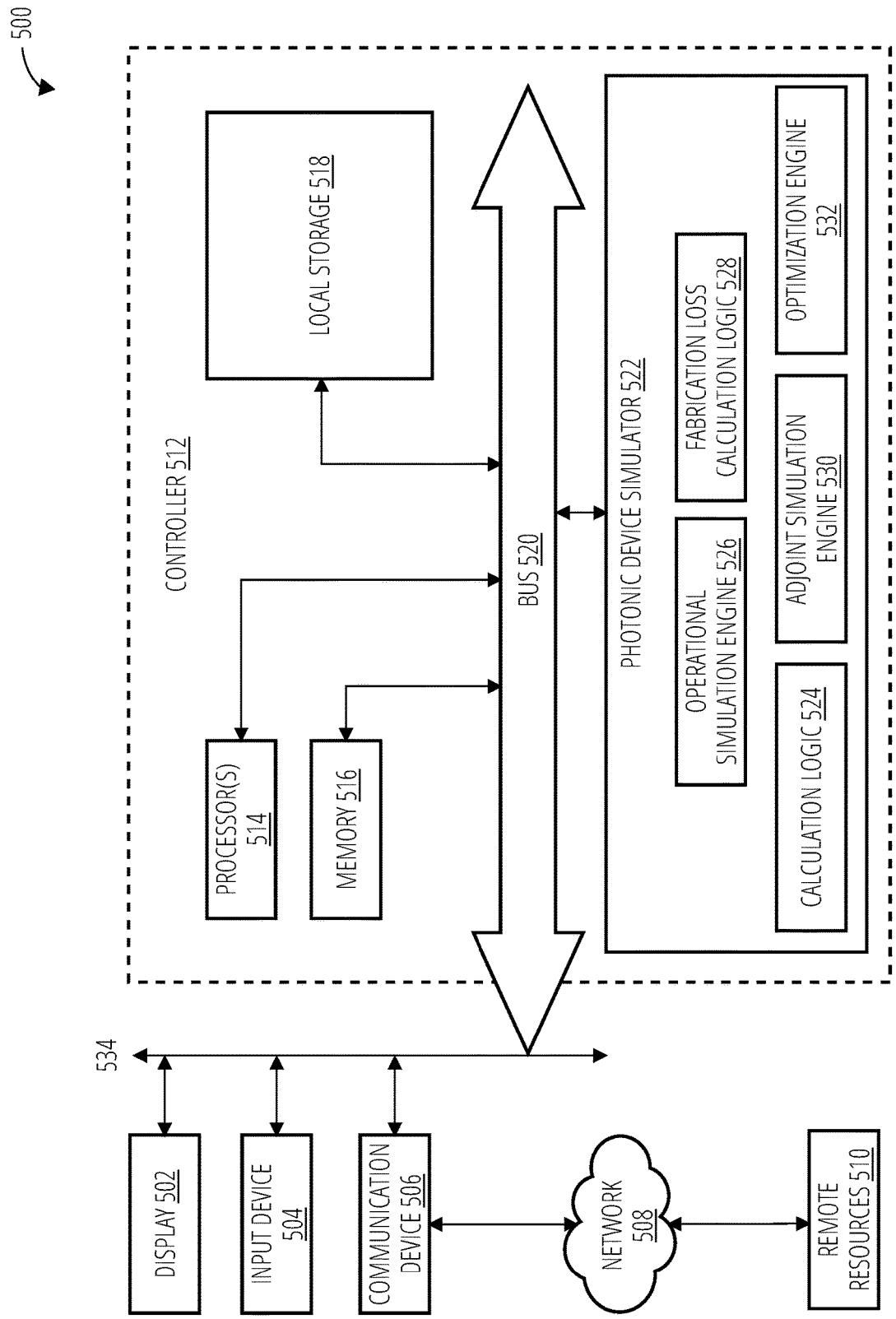
FIG. 5 is a functional block diagram illustrating a non-limiting example embodiment of a system for generating a design of a photonic integrated circuit, according to various aspects of the present disclosure.

FIG. 5 is a functional block diagram illustrating a design optimization system 500 for generating a design of a photonic integrated circuit (i.e., photonic device), in accordance with an embodiment of the disclosure. Design optimization system 500 may be utilized to perform an inverse design process that generates a design with iterative gradient-based optimization that takes into consideration the underlying physics that govern the operation of the photonic integrated circuit. More specifically, design optimization system 500 is a design tool that may be utilized to optimize structural parameters (e.g., shape and arrangement of a first material and a second material within the dispersive region of the embodiments described in the present disclosure) of photonic integrated circuits based on first-principles simulations (e.g., electromagnetic simulations to determine a field response of the photonic device to an excitation source) and iterative gradient-based optimization. In other words, design optimization system 500 may provide a design obtained via the inverse design process that is substantially replicated (i.e., proportionally scaled) by dispersive region 332 and dispersive region 406 of demultiplexer 316 and photonic demultiplexer 400 illustrated in FIG. 3A and FIG. 4A, respectively.

As illustrated, design optimization system 500 includes controller 512, display 502, input device(s) 504, communication device(s) 506, network 508, remote resources 510, bus 534, and bus 520. Controller 512 includes processor 514, memory 516, local storage 518, and photonic device simulator 522. Photonic device simulator 522 includes operational simulation engine 526, fabrication loss calculation logic 528, calculation logic 524, adjoint simulation engine 530, and optimization engine 532. It is appreciated that in some embodiments, controller 512 may be a distributed system that includes multiple computing devices that cooperatively provide the described components.

Controller 512 is coupled to display 502 (e.g., a light emitting diode display, a liquid crystal display, and the like) coupled to bus 534 through bus 520 for displaying information to a user utilizing design optimization system 500 to optimize structural parameters of the photonic device (i.e., demultiplexer). Input device 504 is coupled to bus 534 through bus 520 for communicating information and command selections to processor 514. Input device 504 may include a mouse, trackball, keyboard, stylus, or other computer peripheral, to facilitate an interaction between the user and controller 512. In response, controller 512 may provide verification of the interaction through display 502.

Another device, which may optionally be coupled to controller 512, is a communication device 506 for accessing remote resources 510 of a distributed system via network 508. Communication device 506 may include any of a number of networking peripheral devices such as those used for coupling to an Ethernet, Internet, or wide area network, and the like. Communication device 506 may further include a mechanism that provides connectivity between controller 512 and the outside world. Note that any or all of the components of design optimization system 500 illustrated in FIG. 5 and associated hardware may be used in various embodiments of the present disclosure. The remote resources 510 may be part of a distributed system and include any number of processors, memory, and other resources for optimizing the structural parameters of the photonic device.

Controller 512 orchestrates operation of design optimization system 500 for optimizing structural parameters of the photonic device. Processor 514 (e.g., one or more central processing units, graphics processing units, and/or tensor processing units, etc.), memory 516 (e.g., volatile memory such as DRAM and SRAM, non-volatile memory such as ROM, flash memory, and the like), local storage 518 (e.g., magnetic memory such as computer disk drives), and the photonic device simulator 522 are coupled to each other through bus 520. Controller 512 includes software (e.g., instructions included in memory 516 coupled to processor 514) and/or hardware logic (e.g., application specific integrated circuits, field-programmable gate arrays, and the like) that when executed by controller 512 causes controller 512 or design optimization system 500 to perform operations. The operations may be based on instructions stored within any one of, or a combination of, memory 516, local storage 518, physical device simulator 522, and remote resources 510 accessed through network 508.

In the illustrated embodiment, the components of photonic device simulator 522 are utilized to optimize structural parameters of the photonic device (e.g., MUX/DEMUX 114 of FIG. 1, demultiplexer 206 of FIG. 2A, multiplexer 208 of FIG. 2B, demultiplexer 316 of FIG. 3A-FIG. 3D, and photonic demultiplexer 400 of FIG. 4A-FIG. 4B). In some embodiments, design optimization system 500 may optimize the structural parameters of the photonic device via, inter alia, simulations (e.g., operational and adjoint simulations) that utilize a finite-difference time-domain (FDTD) method, a finite-difference frequency-domain (FDFD) method, or any other suitable technique to model the field response (e.g., electric and magnetic fields within the photonic device). The operational simulation engine 526 provides instructions for performing an electromagnetic simulation of the photonic device operating in response to an excitation source within a simulated environment. In particular, the operational simulation determines a field response of the simulated environment (and thus the photonic device, which is described by the simulated environment) in response to the excitation source for determining a performance metric of the physical device (e.g., based off an initial description or input design of the photonic device that describes the structural parameters of the photonic device within the simulated environment with a plurality of voxels). The structural parameters may correspond, for example, to the specific design, material compositions, dimensions, and the like of the physical device. Fabrication loss calculation logic 528 provides instructions for determining a fabrication loss, which is utilized to enforce a minimum feature size to ensure fabricability. In some embodiments, the fabrication loss is also used to enforce binarization of the design (i.e., such that the photonic device includes a first material and a second material that are interspersed to form a plurality of interfaces). Calculation logic 524 computes a loss metric determined via a loss function that incorporates a performance loss, based on the performance metric, and the fabrication loss. Adjoint simulation engine 530 is utilized in conjunction with the operational simulation engine 526 to perform an adjoint simulation of the photonic device to backpropagate the loss metric through the simulated environment via the loss function to determine how changes in the structural parameters of the photonic device influence the loss metric. Optimization engine 532 is utilized to update the structural parameters of the photonic device to reduce the loss metric and generate a revised description (i.e., revising the design) of the photonic device.

Figure 6A:
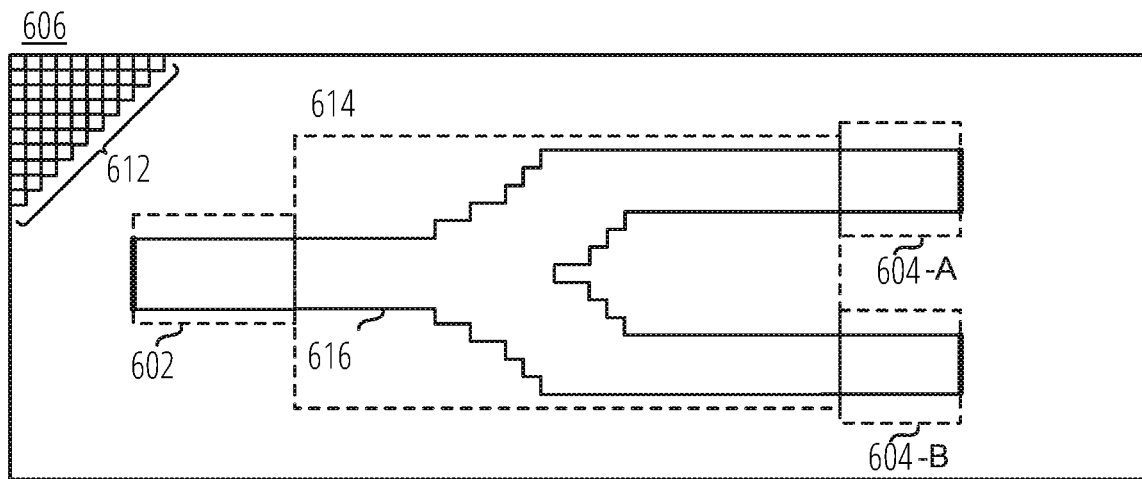
FIG. 6A illustrates a non-limiting example embodiment of a simulated environment describing a photonic integrated circuit, according to various aspects of the present disclosure.
Figure 6B:
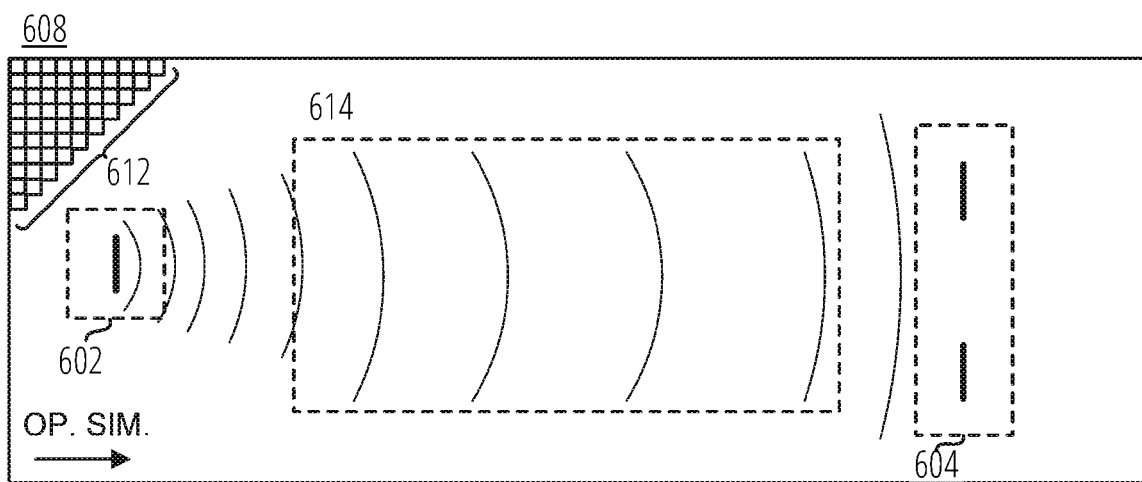
FIG. 6B illustrates a non-limiting example embodiment of an operational simulation of a photonic integrated circuit, according to various aspects of the present disclosure.
Figure 6C:
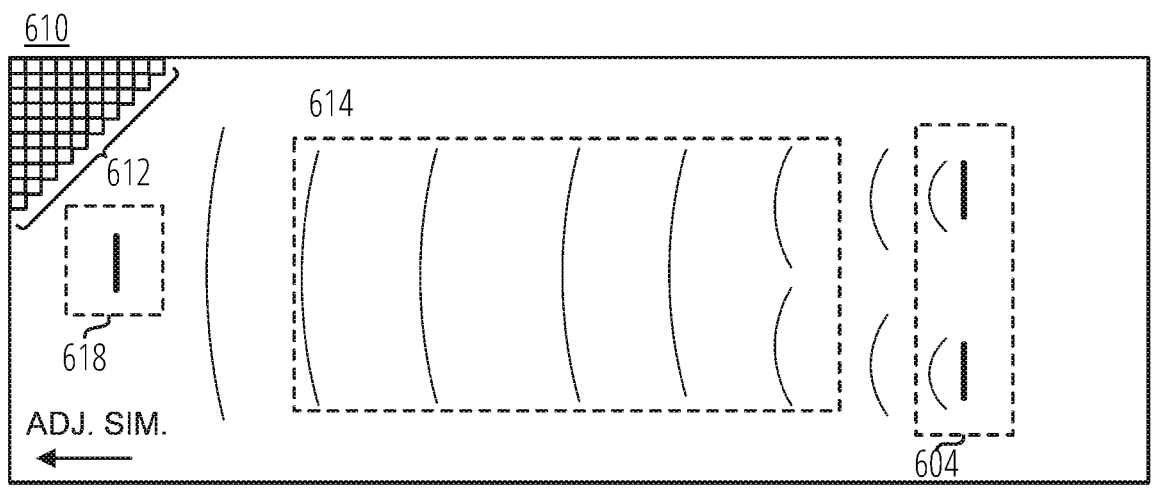
FIG. 6C illustrates a non-limiting example embodiment of an adjoint simulation within the simulated environment by backpropagating a loss value, according to various aspects of the present disclosure.

FIG. 6A-FIG. 6C respectively illustrate non-limiting example embodiments of an initial set up of a simulated environment 606 describing a photonic device, performing an operational simulation of the photonic device in response to an excitation source within the simulated environment 608, and performing an adjoint simulation of the photonic device within the simulated environment 610 according to various aspects of the present disclosure. The initial set up of the simulated environment, 1-dimensional representation of the simulated environment, operational simulation of the physical device, and adjoint simulation of the physical device may be implemented with design optimization system 500 illustrated in FIG. 5.

As illustrated in FIG. 6A-FIG. 6C, simulated environment is represented in two-dimensions. However, it is appreciated that other dimensionality (e.g., 3-dimensional space) may also be used to describe simulated environment and the photonic device. In some embodiments, optimization of structural parameters of the photonic device illustrated in FIG. 6A-FIG. 6C may be achieved via an inverse design process including, inter alia, simulations (e.g., operational simulations and adjoint simulations) that utilize a finite-difference time-domain (FDTD) method, a finite-difference frequency-domain (FDFD) method, or any other suitable technique to model the field response (e.g., electric and magnetic field) to an excitation source.

FIG. 6A illustrates a demonstrative simulated environment 606 describing a photonic integrated circuit (i.e., a photonic device such as a waveguide, demultiplexer, and the like), in accordance with a non-limiting example embodiment of the present disclosure. More specifically, in response to receiving an initial description of a photonic device defined by one or more structural parameters (e.g., an input design), a system (e.g., design optimization system 500 of FIG. 5) configures a simulated environment 606 to be representative of the photonic device. As illustrated, the simulated environment 606 (and subsequently the photonic device) is described by a plurality of voxels 612, which represent individual elements (i.e., discretized) of the two-dimensional (or other dimensionality) space. Each of the voxels 612 is illustrated as a two-dimensional square; however, it is appreciated that the voxels may be represented as cubes or other shapes in three-dimensional space. It is appreciated that the specific shape and dimensionality of the plurality of voxels 612 may be adjusted dependent on the simulated environment 606 and photonic device being simulated. It is further noted that only a portion of the plurality of voxels 612 are illustrated to avoid obscuring other aspects of the simulated environment 606.

Each of the plurality of voxels 612 may be associated with a structural value, a field value, and a source value. Collectively, the structural values of the simulated environment 606 describe the structural parameters of the photonic device. In one embodiment, the structural values may correspond to a relative permittivity, permeability, and/or refractive index that collectively describe structural (i.e., material) boundaries or interfaces of the photonic device (e.g., material interface pattern 420 of FIG. 4B). For example, an interface 616 is representative of where relative permittivity changes within the simulated environment 606 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of voxels 612. Thus, the field response may be based, at least in part, on the structural parameters of the photonic device and the excitation source.

In the illustrated embodiment, the photonic device corresponds to an optical demultiplexer having a design region 614 (e.g., corresponding to dispersive region 332 of FIG. 3A, and/or dispersive region 406 of FIG. 4A), in which structural parameters of the physical device may be updated or otherwise revised. More specifically, through an inverse design process, iterative gradient-based optimization of a loss metric determined from a loss function is performed to generate a design of the photonic device that functionally causes a multi-channel optical signal to be demultiplexed and guided from input port 602 to a corresponding one of the output ports 604. Thus, input port 602 (e.g., corresponding to input region 302 of FIG. 3A, input region 402 of FIG. 4A, and the like) of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 606). In other words, the excitation source may cause the field response of the photonic device to change, which is dependent on the underlying physics governing the physical domain and the structural parameters of the photonic device. The excitation source originates or is otherwise proximate to input port 602 and is positioned to propagate (or otherwise influence the field values of the plurality of voxels) through the design region 614 towards output ports 604 of the photonic device. In the illustrated embodiment, the input port 602 and output ports 604 are positioned outside of the design region 614. In other words, in the illustrated embodiment, only a portion of the structural parameters of the photonic device is optimizable.

However, in other embodiments, the entirety of the photonic device may be placed within the design region 614 such that the structural parameters may represent any portion or the entirety of the design of the photonic device. The electric and magnetic fields within the simulated environment 606 (and subsequently the photonic device) may change (e.g., represented by field values of the individual voxels that collectively correspond to the field response of the simulated environment) in response to the excitation source. The output ports 604 of the optical demultiplexer may be used for determining a performance metric of the photonic device in response to the excitation source (e.g., power transmission from input port 602 to a specific one of the output ports 604). The initial description of the photonic device, including initial structural parameters, excitation source, performance parameters or metrics, and other parameters describing the photonic device, are received by the system (e.g., design optimization system 500 of FIG. 5) and used to configure the simulated environment 606 for performing a first-principles based simulation of the photonic device. These specific values and parameters may be defined directly by a user (e.g., of design optimization system 500 in FIG. 5), indirectly (e.g., via controller 512 culling pre-determined values stored in memory 516, local storage 518, or remote resources 510), or a combination thereof.

FIG. 6B illustrates a non-limiting example embodiment of an operational simulation of the photonic device in response to an excitation source within simulated environment 608, in accordance with various aspects of the present disclosure. In the illustrated embodiment, the photonic device is an optical demultiplexer structured to optically separate each of a plurality of distinct wavelength channels included in a multi-channel optical signal received at input port 602 and respectively guide each of the plurality of distinct wavelength channels to a corresponding one of the plurality of output ports 604. The excitation source may be selected (randomly or otherwise) from the plurality of distinct wavelength channels and originates at input port 602 having a specified spatial, phase, and/or temporal profile. The operational simulation occurs over a plurality of time steps, including the illustrated time step. When performing the operational simulation, changes to the field response (e.g., the field value) for each of the plurality of voxels 612 are incrementally updated in response to the excitation source over the plurality of time steps. The changes in the field response at a particular time step are based, at least in part, on the structural parameters, the excitation source, and the field response of the simulated environment 610 at the immediately prior time step included in the plurality of time steps. Similarly, in some embodiments the source value of the plurality of voxels 612 is updated (e.g., based on the spatial profile and/or temporal profile describing the excitation source). It is appreciated that the operational simulation is incremental and that the field values (and source values) of the simulated environment 610 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In one embodiment, the performance metric corresponds to the power transmission at a corresponding one of the output ports 604 mapped to the distinct wavelength channel being simulated by the excitation source. In other words, in some embodiments, the performance metric represents power (at one or more frequencies of interest) in the target mode shape at the specific locations of the output ports 604. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on loss metric) for updating or otherwise revising the structural parameters to reduce the loss metric (i.e. increase the performance metric). It is noted that the loss metric may be further based on a fabrication loss value that is utilized to enforce a minimum feature size of the photonic device to promote fabricability of the device, and/or other loss values.

FIG. 6C illustrates a non-limiting example embodiment of an adjoint simulation within simulated environment 610 by backpropagating a loss metric, in accordance with various aspects of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 604) or other location that corresponds to a location used when determining the performance metric. The adjoint source(s) is then treated as a physical stimuli or an excitation source during the adjoint simulation. A loss response of the simulated environment 608 is computed for each of the plurality of time steps (e.g., backwards in time) in response to the adjoint source. The loss response collectively refers to loss values of the plurality of voxels 612 that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range such that the photonic device provides the desired performed while maintaining fabricability.

Figure 7:
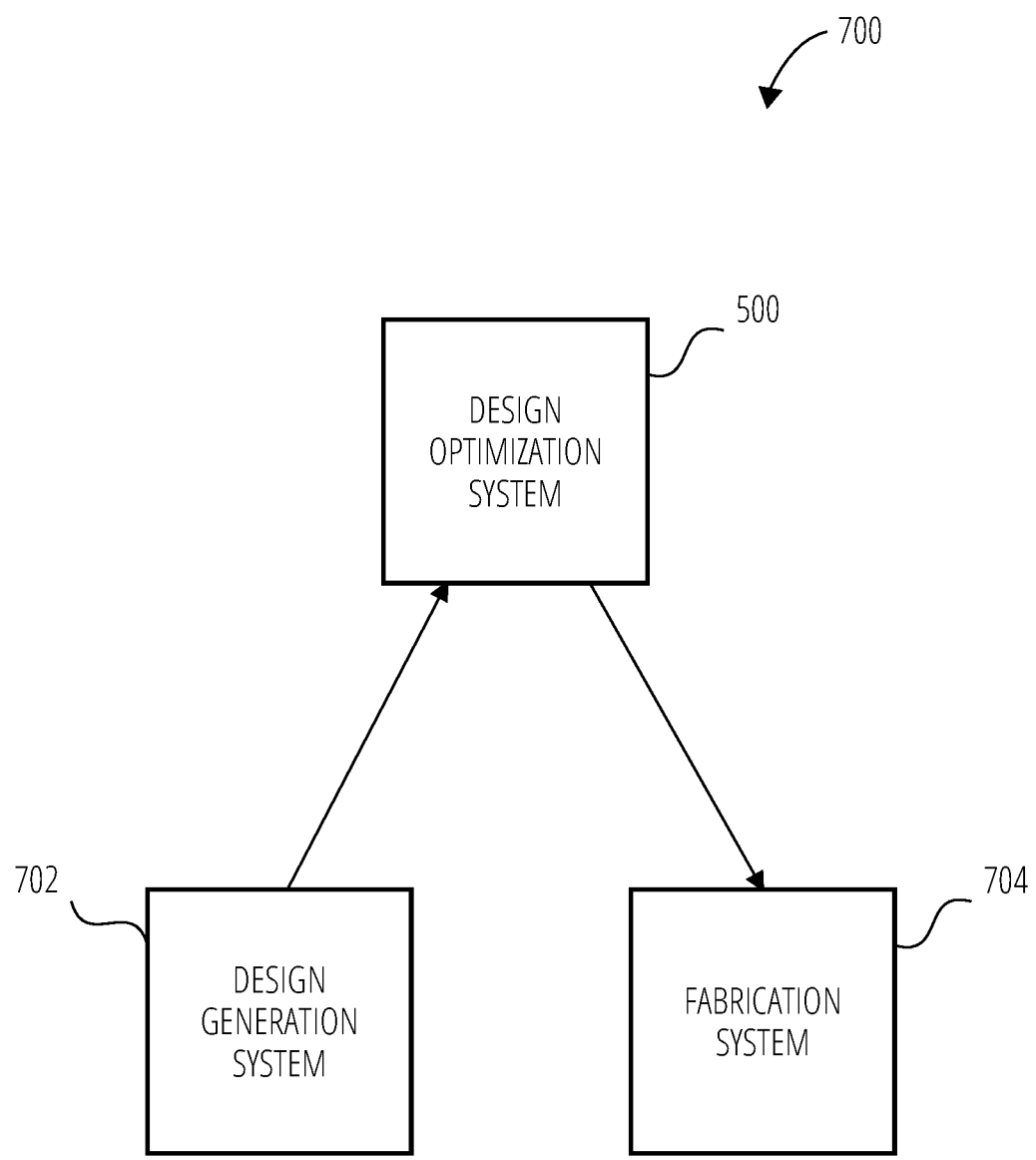
FIG. 7 is a block diagram that illustrates a non-limiting example embodiment of a system according to various aspects of the present disclosure.

FIG. 7 is a block diagram that illustrates a non-limiting example embodiment of a system according to various aspects of the present disclosure. Overall, the illustrated embodiment of the system 700 is configured to generate proposed segmented designs, to optimize the proposed segmented designs, and to fabricate physical devices based on the proposed segmented designs.

As shown, the system 700 includes a design generation system 702, a fabrication system 704, and a design optimization system 500. Communication between the design generation system 702, the design optimization system 500, and the fabrication system 704 may occur via a network (not pictured), via exchange of a removable computer-readable medium (not pictured), or via any other suitable technique. Though the design generation system 702, fabrication system 704, and design optimization system 500 are illustrated as separate systems, in some embodiments, some portions of these systems may be combined. As one non-limiting example, the design generation system 702 and the design optimization system 500 may be combined in a single system. Also, in some embodiments, systems illustrated in FIG. 7 as a single system may be broken into multiple systems.

In some embodiments, the design generation system 702 may include one or more computing devices that are configured to generate segmented designs that achieve a desired result. For example, the design generation system 702 may use forward simulation and backpropagation techniques to generate a segmented design for an electromagnetic device (or any other type of physical device) that has desired characteristics. This is a non-limiting example only, and any other technique, including but not limited to manual design, may be used by the design generation system 702 to create proposed segmented designs.

In some embodiments, the fabrication system 704 may be any suitable system for fabricating a segmented design. In some embodiments, the fabrication system 704 may be a photolithography system or an additive manufacturing system. In some embodiments, the fabrication system 704 may have characteristics that include a minimum feature size, a minimum feature shape, and/or other constraints that help define the segmented designs that the fabrication system 704 is capable of fabricating. To that end, the fabrication system 704 may provide a design rule checker that is configured to process proposed segmented designs in an inefficient legacy manner to determine whether the proposed segmented designs comply with the constraints of the fabrication system 704.

In some embodiments, the design optimization system 500 may be any suitable computing device or collection of computing devices configured to provide the described functionality of the design optimization system 500 as illustrated and described previously.

Figure 8:
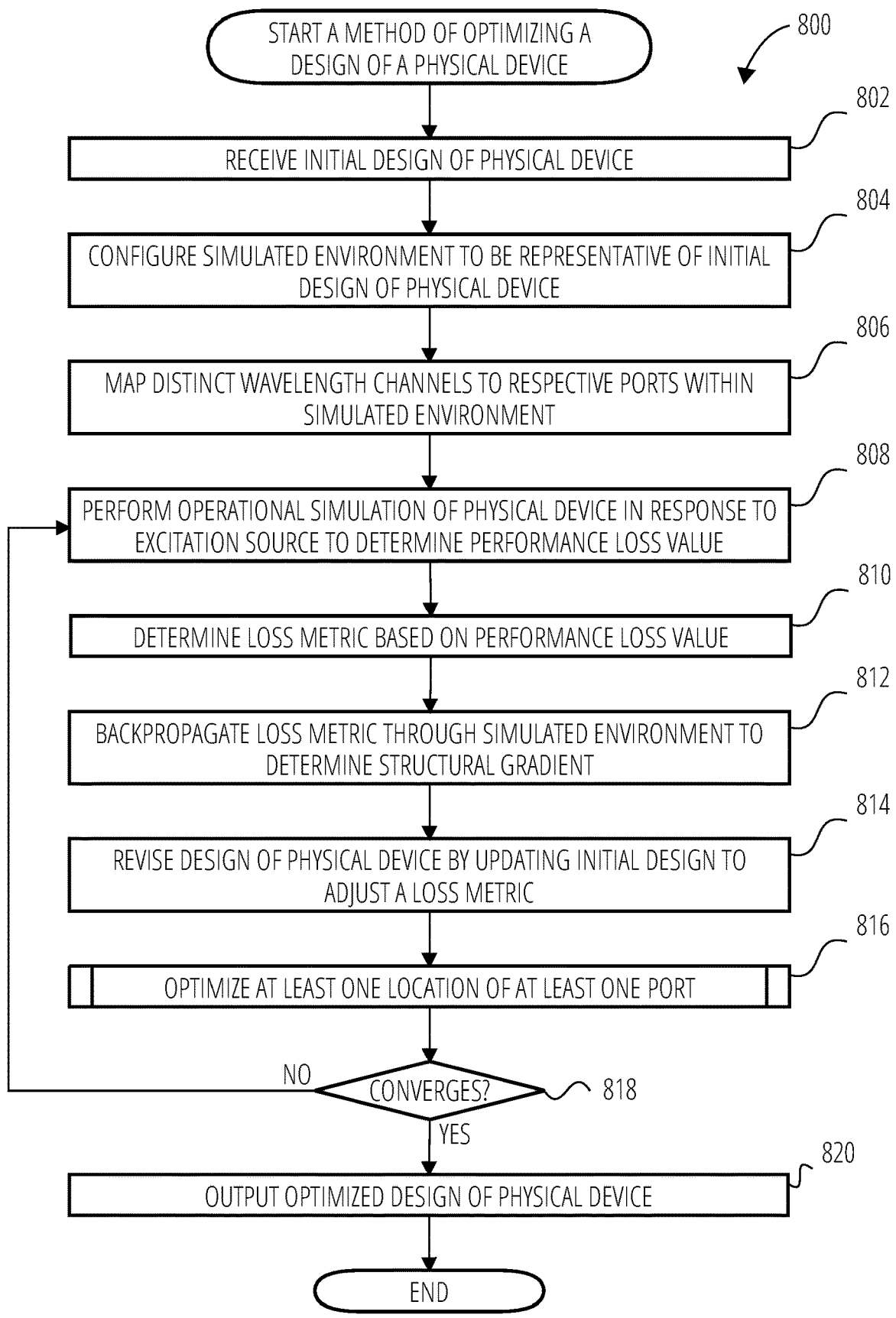
FIG. 8 is a flowchart that illustrates a non-limiting example embodiment of a method for generating a design of physical device such as a photonic integrated circuit, in accordance with various aspects of the present disclosure.

FIG. 8 is a flowchart that illustrates a non-limiting example embodiment of a method for generating a design of physical device such as a photonic integrated circuit, in accordance with various aspects of the present disclosure. It is appreciated that method 800 is an inverse design process that may be accomplished by performing operations with a system (e.g., design optimization system 500 of FIG. 5) to perform iterative gradient-based optimization of a loss metric determined from a loss function that includes at least a performance loss. In the same or other embodiments, method 800 may be included as instructions provided by at least one machine-accessible storage medium (e.g., non-transitory memory) that, when executed by a machine, will cause the machine to perform operations for generating and/or improving the design of the photonic integrated circuit. It is further appreciated that the order in which some or all of the process blocks appear in method 800 should not be deemed limiting. Rather, one of ordinary skill in the art having the benefit of the present disclosure will understand that some of the process blocks may be executed in a variety of orders not illustrated, or even in parallel.

From a start block, the method 800 proceeds to block 802, where an initial design of a physical device such as a photonic integrated circuit is received. In some embodiments, the physical device may be expected to have a certain functionality (e.g., perform as an optical demultiplexer) after optimization, and the initial design provided to the method 800 may include desired performance characteristics for the output of the method 800. In some embodiments, the initial design may also specify a number of ports for the physical device (input ports and/or output ports), and may specify locations for one or more of the ports within a periphery region of the physical device. In some embodiments, each of the ports may be associated in the initial design with specific certain functionality after optimization (e.g., receive as input or provide as output specific wavelengths or wavelength bands).

In some embodiments, the initial design may describe structural parameters of the physical device within a simulated environment. The simulated environment may include a plurality of voxels that collectively describe the structural parameters of the physical device. Each of the plurality of voxels is associated with a structural value to describe the structural parameters, a field value to describe the field response (e.g., the electric and magnetic fields in one or more orthogonal directions) to physical stimuli (e.g., one or more excitation sources), and a source value to describe the physical stimuli.

In some embodiments the initial design may be a first description of the physical device in which values for the structural parameters may be random values or null values outside of the periphery region such that there is no bias for the initial (e.g., first) design. Likewise, the initial design may determine initial locations for each of the ports within the periphery region randomly, randomly within specified sub-portions of the periphery region (e.g., input ports randomly placed within an input region, output ports randomly placed within an output region), or at other default locations (e.g., centered and/or evenly distributed throughout an input region or output region).

It is appreciated that the initial description or input design may be a relative term. Thus, in some embodiments an initial description may be a first description of the physical device described within the context of the simulated environment (e.g., a first input design for performing a first operational simulation). However, in other embodiments, the term initial description may refer to an initial description of a particular cycle (e.g., of performing an operational simulation, operating an adjoint simulation, and updating the structural parameters and/or locations of one or more ports). In such an embodiment, the initial design or design of that particular cycle may correspond to a revised description or refined design (e.g., generated from a previous cycle).

In some embodiments, the simulated environment includes a design region that includes a portion of the plurality of voxels which have structural parameters that may be updated, revised, or otherwise changed to optimize the structural parameters of the physical device. In the same or other embodiments, the structural parameters are associated with geometric boundaries and/or material compositions of the physical device based on the material properties (e.g., relative permittivity, index of refraction, etc.) of the simulated environment.

At block 804, a simulated environment is configured to be representative of the initial design of the physical device (e.g., photonic device). Once the structural parameters have been received or otherwise obtained, the simulated environment is configured (e.g., the number of voxels, shape/arrangement of voxels, and specific values for the structural value, field value, and/or source value of the voxels are set based on the perturbed structural parameters, and the ports are positioned based on the locations for the ports).

In some embodiments the simulated environment includes a design region optically coupled between a first communication region and a plurality of second communication regions. In some embodiments, the first communication region may correspond to an input region or port (e.g., where an excitation source originates), while the second communication region may correspond to a plurality of output regions or ports (e.g., when designing an optical demultiplexer that optically separates a plurality of distinct wavelength channels included in a multi-channel optical signal received at the input port and respectively guiding each of the distinct wavelength channels to a corresponding one of the plurality of output ports). However, in other embodiments, the first communication region may correspond to an output region or port, while the plurality of second communication regions corresponds to a plurality of input ports or region (e.g., when designing an optical multiplexer that optically combines a plurality of distinct wavelength signals received at respective ones of the plurality of input ports to form a multi-channel optical signal that is guided to the output port).

Block 806 shows mapping each of a plurality of distinct wavelength channels to a respective one of the ports. The distinct wavelength channels may be mapped to the ports by virtue of the initial design of the physical device. For example, a loss function may be chosen that associates a performance metric of the physical device with power transmission from the input port to individual output ports for mapped channels. In one embodiment, a first channel included in the plurality of distinct wavelength channels is mapped to a first output port, meaning that the performance metric of the physical device for the first channel is tied to the first output port. Similarly, other output ports may be mapped to the same or different channels included in the plurality of distinct wavelength channels such that each of the distinct wavelength channels is mapped to a respective one of the plurality of output ports (i.e., second communication regions) within the simulated environment. In one embodiment, the plurality of ports includes four ports and the plurality of distinct wavelength channels includes four channels that are each mapped to a corresponding one of the four ports. In other embodiments, there may be a different number of output ports (e.g., 8 ports) and a different number of channels (e.g., 8 channels) that are each mapped to a respective one of the output ports.

Block 808 illustrates performing an operational simulation of the physical device within the simulated environment operating in response to one or more excitation sources to determine a performance loss value. More specifically, in some embodiments an electromagnetic simulation is performed in which a field response of the photonic integrated circuit is updated incrementally over a plurality of time steps to determine how the field response of the physical device changes due to the excitation source. The field values of the plurality of voxels are updated in response to the excitation source and based, at least in part, on the structural parameters of the integrated photonic circuit. Additionally, each update operation at a particular time step may also be based, at least in part, on a previous (e.g., immediately prior) time step.

Consequently, the operational simulation simulates an interaction between the photonic device (i.e., the photonic integrated circuit) and a physical stimuli (i.e., one or more excitation sources) to determine a simulated output of the photonic device (e.g., at one or more of the output ports or regions) in response to the physical stimuli. The interaction may correspond to any one of, or combination of a perturbation, retransmission, attenuation, dispersion, refraction, reflection, diffraction, absorption, scattering, amplification, or otherwise of the physical stimuli within electromagnetic domain due, at least in part, to the structural parameters of the photonic device and underlying physics governing operation of the photonic device. Thus, the operational simulation simulates how the field response of the simulated environment changes due to the excitation source over a plurality of time steps (e.g., from an initial to final time step with a pre-determined step size).

In some embodiments, the simulated output may be utilized to determine one or more performance metrics of the physical device. For example, the excitation source may correspond to a selected one of a plurality of distinct wavelength channels that are each mapped to one of the plurality of output ports. The excitation source may originate at or be disposed proximate to the first communication region (i.e., a port designated as the input port) when performing the operational simulation. During the operational simulation, the field response at the output port mapped to the selected one of the plurality of distinct wavelength channels may then be utilized to determine a simulated power transmission of the photonic integrated circuit for the selected distinct wavelength channel. In other words, the operational simulation may be utilized to determine the performance metric that includes determining a simulated power transmission of the excitation source from the first communication region/port, through the design region, and to a respective one of the plurality of second communication regions/ports mapped to the selected one of the plurality of distinct wavelength channels.

In some embodiments, the excitation source may cover the spectrum of all of the plurality of output ports (e.g., the excitation source spans at least the targeted frequency ranges for the bandpass regions for each of the plurality of distinct wavelength channels as well as the corresponding transition band regions, and at least portions of the corresponding stopband regions) to determine a performance metric (i.e., simulated power transmission) associated with each of the distinct wavelength channels for the photonic integrated circuit. In some embodiments, one or more frequencies that span the passband of a given one of the plurality of distinct wavelength channels is selected randomly to optimize the design (e.g., batch gradient descent while having a full width of each passband including ripple in the passband that meets the target specifications). In the same or other embodiments, each of the plurality of distinct wavelength channels has a common bandwidth with different center wavelengths. The performance metric may then be used to generate a performance loss value for the set of structural parameters. The performance loss value may correspond to a difference between the performance metric and a target performance metric of the physical device.

Block 810 shows determining a loss metric based on the performance loss value. In some embodiments, the loss metric may also include a fabrication loss associated with, for example, a minimum feature size. In some embodiments the loss metric is determined via a loss function that includes both the performance loss value and the fabrication loss as input values.

Block 812 illustrates backpropagating the loss metric via the loss function through the simulated environment to determine an influence of changes in the structural parameters on the loss metric (i.e., structural gradient). The loss metric is treated as an adjoint or virtual source and is backpropagated incrementally from a final time step to earlier time steps in a backwards simulation to determine the structural gradient of the physical device.

Block 814 shows revising a design of the physical device (e.g., generated a revised description) by updating the structural parameters of the initial design to adjust the loss metric. In some embodiments, adjusting for the loss metric may reduce the loss metric. However, in other embodiments, the loss metric may be adjusted or otherwise compensated in a manner that does not necessarily reduce the loss metric, In one embodiment, adjusting the loss metric may maintain fabricability while providing a general direction within the parameterization space to obtain designs that will ultimately result in increased performance while also maintaining device fabricability and targeted performance metrics.

In some embodiments, the revised description is generated by utilizing an optimization scheme after a cycle of operational and adjoint simulations via a gradient descent algorithm, Markov Chain Monte Carlo algorithm, or other optimization techniques. Put in another way, iterative cycles of simulating the physical device, determining a loss metric, backpropagating the loss metric, and updating the structural parameters to adjust the loss metric may be successively performed until the loss metric substantially converges such that the difference between the performance metric and the target performance metric is within a threshold range. In some embodiments, the term "converges" may simply indicate the difference is within the threshold range and/or below some threshold value.

Subroutine block 816 shows optimizing at least one location of at least one port of the design of the physical device. Any suitable technique may be used to optimize at least one location of at least one port, including but not limited to the procedure 900 illustrated in FIG. 9 and described in detail below. In some embodiments, subroutine block 816 may be performed for every iteration of the update of the initial design between blocks 808-814. However, if an effect of the subroutine block 816 is not adjusted over time (such as by adjusting a learning rate of a loss function in the executed procedure), this may cause difficulties in converging to an acceptable design because the optimization of the design region will be attempting to optimize toward a moving target. Accordingly, in some embodiments, subroutine block 816 may not be performed for every iteration of the update of the initial design, but instead will be performed once for multiple iterations of the update of the initial design. In some embodiments, the method 800 may alternate between multiple iterations of the optimization of the design region and multiple iterations of the subroutine block 816.

At decision block 818, a determination is made regarding whether the loss metric substantially converges such that the difference between the performance metric and the target performance metric is within a threshold range. Iterative cycles of simulating the physical device with the excitation source selected from the plurality of distinct wavelength channels, backpropagating the loss metric, revising the design by updating the structural parameters, and optionally adjusting the locations of one or more ports reduce the loss metric until the loss metric substantially converges such that the difference between the performance metric and the target performance metric is within a threshold range. In some embodiments, the structural parameters of the design region of the integrated photonic circuit are revised when performing the cycles to cause the design region of the photonic integrated circuit to optically separate each of the plurality of distinct wavelength channels from a multi-channel optical signal received via the first communication region (input port) and guide each of the plurality of distinct wavelength channels to the corresponding one of the plurality of second communication regions (output ports). In some embodiments, instead of testing for convergence at decision block 818, the determination may be based on whether a predetermined number of iterations has been performed.

If the determination is that the loss metric has not converged, then the result of decision block 818 is NO, and the method 800 returns to block 808 to iterate on the revised initial design. Otherwise, if the determination is that the loss metric has converged, then the result of decision block 818 is YES and the method 800 advances to block 820.

Block 820 illustrates outputting an optimized design of the physical device in which the structural parameters have been updated to have the difference between the performance metric and the target performance metric within a threshold range. The method 800 then proceeds to an end block and terminates. The output optimized design may be provided to a fabrication system in order to fabricate the physical device.

Figure 9:
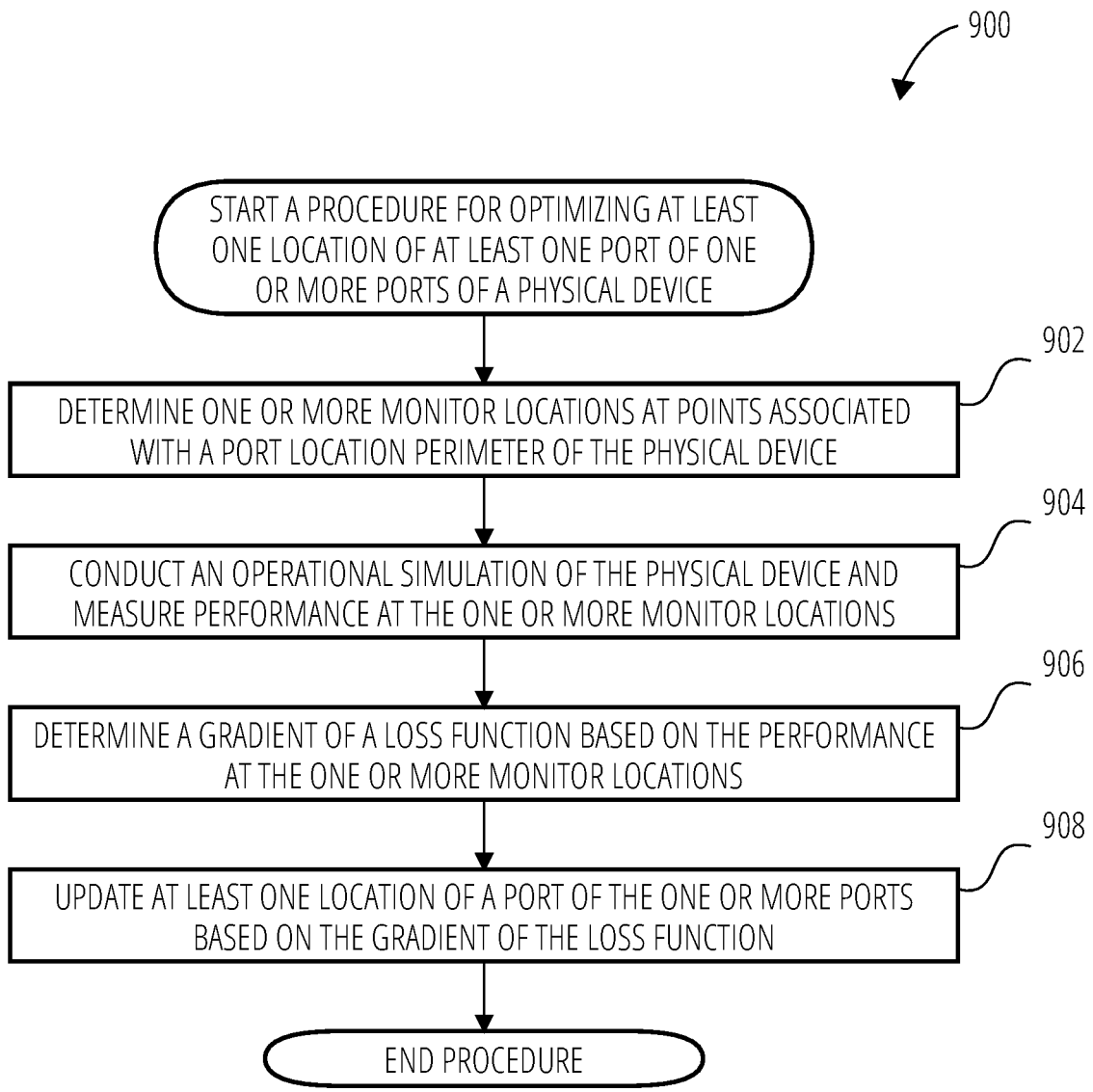
FIG. 9 is a flowchart that illustrates a non-limiting example embodiment of a procedure for optimizing at least one location of at least one port of one or more ports of a physical device according to various aspects of the present disclosure.

FIG. 9 is a flowchart that illustrates a non-limiting example embodiment of a procedure for optimizing at least one location of at least one port of one or more ports of a physical device according to various aspects of the present disclosure. The procedure 900 is a non-limiting example embodiment of a procedure suitable for use at subroutine block 816 of method 800 described above. In the procedure 900, the design optimization system 500 determines whether performance of the physical device would be improved by moving one or more of the ports, and if so, moves one or more of the ports to locations that produce better performance.

From a start block, the procedure 900 advances to block 902, which illustrates determining one or more monitor locations at points associated with a port location perimeter of the physical device. Because the performance of the physical device is simulated within a simulated environment, monitor locations may be specified at any desired location without changing the results of the simulation. In some embodiments, monitor locations may be determined to coincide with the locations within the port location perimeter of the ports themselves, and will thus measure the performance at the locations of the ports. In some embodiments, monitor locations may also be established at other locations within the port location perimeter in order to detect locations far from the locations of the ports that may provide better performance.

In some embodiments, multiple monitors may be associated with a given monitor location. For example, a first monitor that measures performance for a first performance goal (e.g., at a first desired output wavelength) and a second monitor that measures performance for a second performance goal (e.g., at a second desired output wavelength) may be established at a location associated with a first port. Likewise, a third monitor that measures performance for the first performance goal and a fourth monitor that measures performance for the second performance goal may also be established at a location associated with a second port. By measuring both goals for each port, the procedure 900 can detect circumstances wherein performance would be improved by swapping locations of the ports.

Block 904 illustrates conducting an operational simulation of the physical device and measuring performance at the one or more monitor locations. In some embodiments, the operational simulation and measurement of performance is performed using techniques similar to those illustrated in block 808 and discussed above.

Block 906 illustrates determining a gradient of a loss function based on the performance at the one or more monitor locations. In some embodiments, the loss function includes a term that compares measured performance of one or more of the ports to a desired performance. In some embodiments, the loss function includes a term that combines the comparisons of each ports to the desired performance of each port.

In some embodiments, the loss function may also include terms that help enforce fabrication constraints on the locations of the ports. For example, due to size constraints on connectivity hardware, there may be minimum distances at which ports must be spaced from one another for both ports to be usable. Accordingly, the loss function may include a term that enforces a minimum port-to-port spacing between the ports.

Block 906 illustrates updating at least one location of a port of the one or more ports based on the gradient of the loss function. In some embodiments, the gradients at each monitor location are used to determine directions each port should be moved. In some embodiments, the gradients may indicate that the locations of two ports should be swapped. In some embodiments, the gradients may indicate that a port should be moved to a different side of the periphery region. Illustration of each of these situations is provided below.

In some embodiments, one or more learning rates may be provided to alter the affects of the gradients for various terms in the loss function over time. For example, in some embodiments a learning rate for a term that enforces a minimum port-to-port spacing may be very low in early iterations in order to allow potentially unusable portions of the solution space to be considered, and then be raised over time so that the final product will include locations for the port that comply with the minimum port-to-port spacing constraint. In some embodiments separate learning rates may be provided on a port-by-port basis so that the effects of moving various ports can be isolated from each other. For instance, a learning rate for an input port may be kept low, while learning rates for output ports start high and are lowered over time. As another example, learning rates may be kept low for all ports except for one port that is to be optimized, and the port being optimized may be changed over time to cycle through two or more of the ports.

In some embodiments, an overall learning rate value may be applied to a gradient for the overall loss function. In such embodiments, the overall learning rate may be high in early iterations to allow the locations of the ports to be changed a great deal, and may be lowered in later iterations to allow the locations of the ports to stabilize and so that the optimization of the design region is dominant in the optimization of the overall physical device.

The procedure 900 then advances to an end block and returns execution to its caller.

FIG. 10A-FIG. 10E are schematic illustrations of non-limiting example embodiments of optimization of locations of ports in a physical device according to various aspects of the present disclosure. These figures are helpful to illustrate the changes to locations of ports that may be made by some embodiments of the procedure 900 discussed above. The proposed design 1002 illustrated in these figures has features similar to the designs illustrated in FIG. 3A, FIG. 4A, FIG. 4B, and elsewhere herein.

Figure 10A:
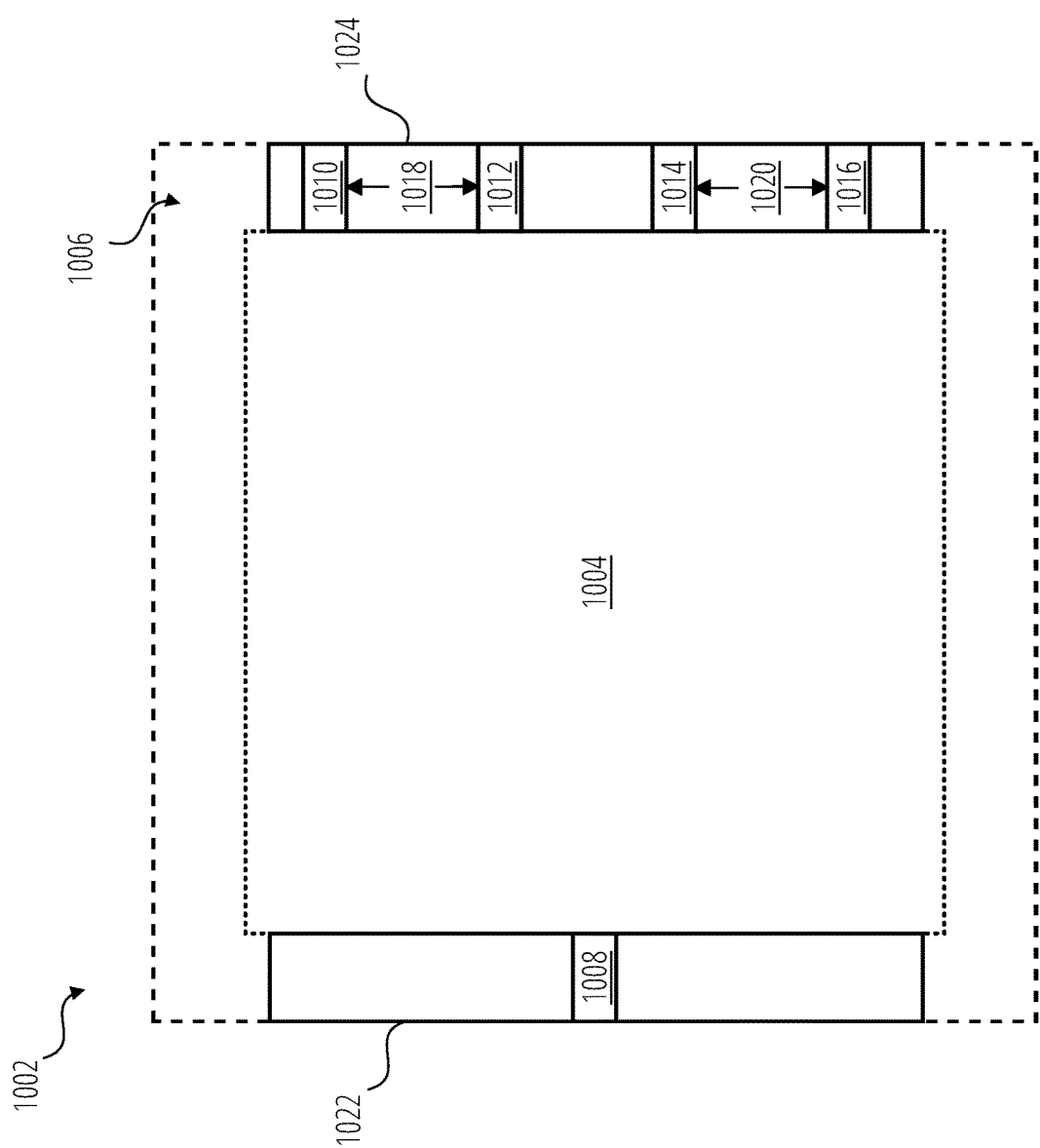
FIG. 10A-FIG. 10E are schematic illustrations of non-limiting example embodiments of optimization of locations of ports in a physical device according to various aspects of the present disclosure.
Figure 10B:
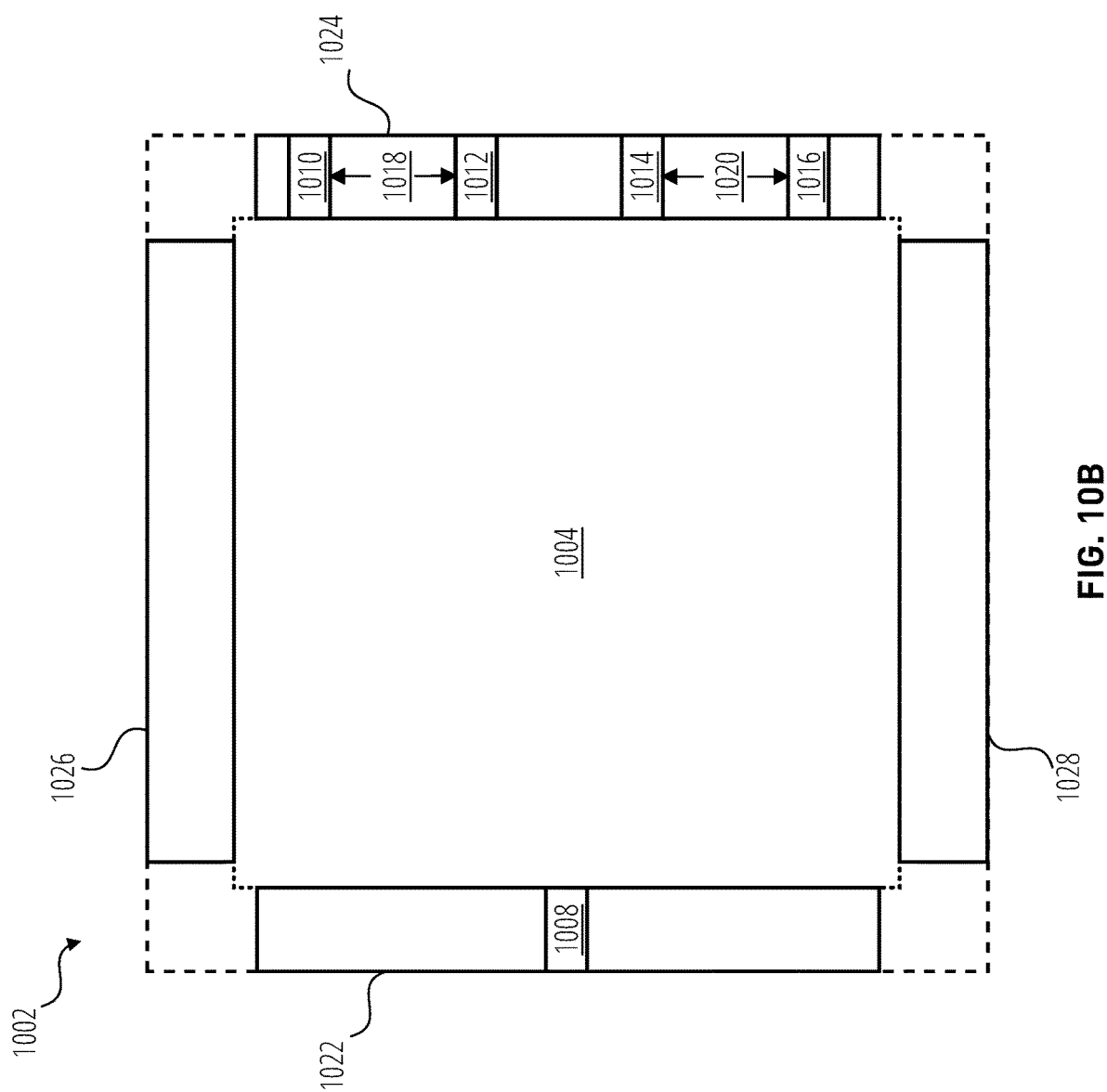

In FIG. 10A, the proposed design 1002 is shown as having a design region 1004 and a periphery region 1006. The design region 1004 is optimized using iterations of the actions of block 808-block 814 of the method 800, and is not illustrated further to avoid obscuring the features related to port location optimization. A first port 1008, a second port 1010, a third port 1012, a fourth port 1014, and a fifth port 1016 are located in the periphery region 1006. The first port 1008 is located on a first side 1022 of the periphery region 1006, and the second port 1010, third port 1012, fourth port 1014, and fifth port 1016 are located on a second side 1024 of the periphery region 1006. The illustrated first port 1008 may represent an input port and each of the second port 1010, third port 1012, fourth port 1014, and fifth port 1016 may represent output ports, though this illustration of the numbers, locations, and functionality of the ports should not be seen as limiting. One or more of the ports (e.g., the output ports) are each associated with a desired performance for the port.

Any suitable technique may have been used to place the ports 1008-1016 in their initial locations. In some embodiments, each of the ports may have been placed at random locations within the periphery region 1006. In some embodiments, input ports may be positioned randomly (or otherwise) on the first side 1022 and output ports may be positioned randomly (or otherwise) on the second side 1024. In some embodiments, the ports may be evenly spaced and centered within the periphery region 1006 or an appropriate area of the periphery region 1006. As illustrated, the first port 1008 is centered in the first side 1022, and the second port 1010, third port 1012, fourth port 1014, and fifth port 1016 are evenly distributed on the second side 1024, with a first spacing 1018 between the second port 1010 and the third port 1012, and a second spacing 1020 between the fourth port 1014 and the fifth port 1016.

In some embodiments, optimization of the locations of the ports may be limited to moving ports within a side of the proposed design 1002 in which they are assigned to begin with. This may be desirable in embodiments where designated sides of the physical device are intended for specific purposes (e.g., an input side and an output side) in order to integrate the physical device with other components. In other embodiments, the optimization of the ports may move the ports to any side. Accordingly, in FIG. 10B, a third side 1026 and a fourth side 1028 are illustrated as locations in which a location of a port may be specified. Though the figures are illustrated in two-dimensions, one of ordinary skill in the art will recognize that the present disclosure is also applicable to use in three-dimensions, and so additional port locations into and/or out of the plane of the figure could also be considered.

Figure 10C:
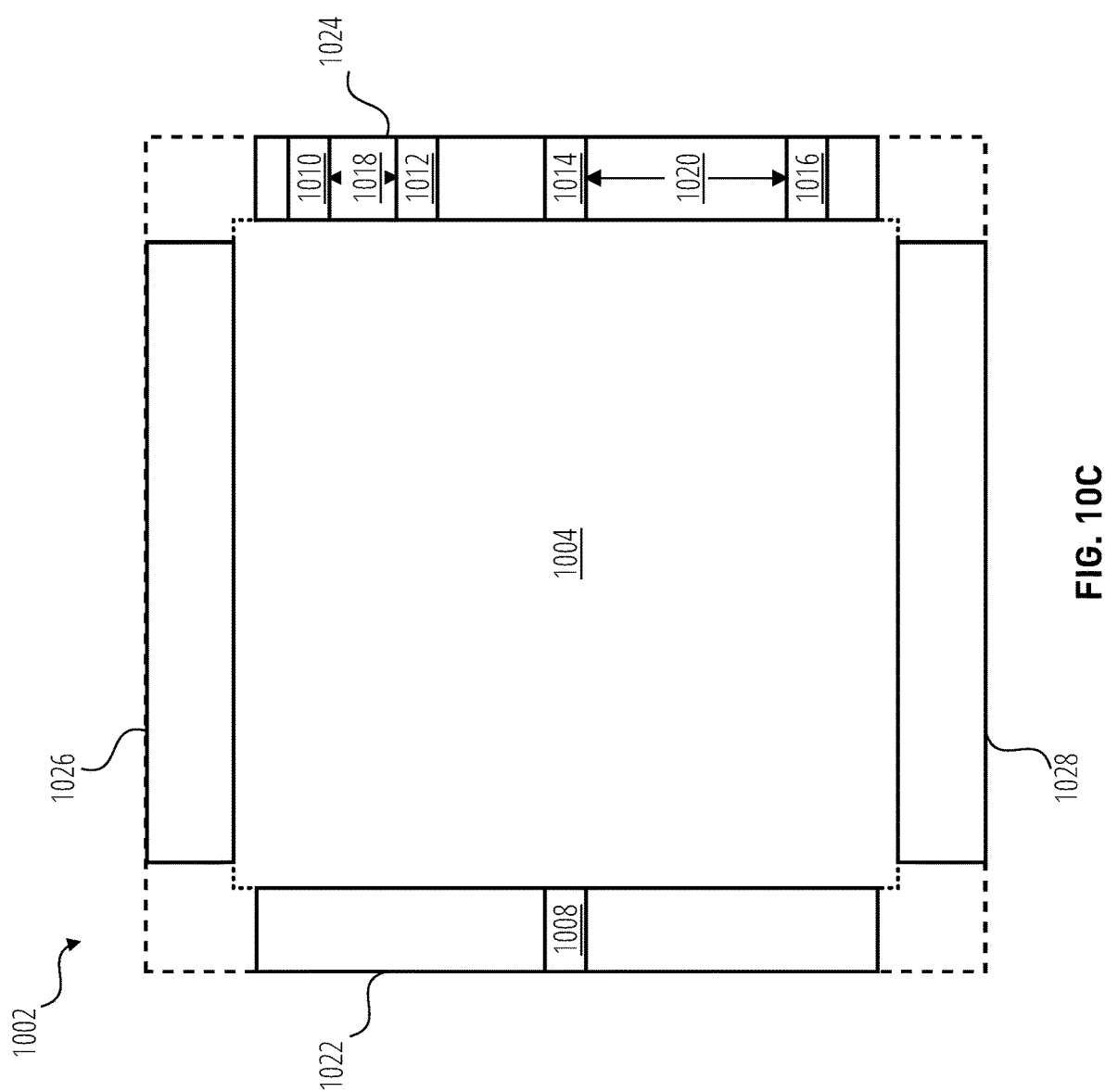

In FIG. 10C, the proposed design 1002 has been processed though the procedure 900 one or more times, such that the locations of some of the ports have been adjusted. As shown, the location of the third port 1012 and the fourth port 1014 have been altered based on the gradients of the loss function—the third port 1012 has been moved up, and the fourth port 1014 has also been moved up. Accordingly, the first spacing 1018 is now smaller, and the second spacing 1020 is now larger. During the procedure 900, monitor locations (not shown) may have been established associated with the locations of each of the ports 1010-1016, and/or with other locations, in order to determine gradients to improve the locations. The term of the loss function that ensures a minimum port-to-port spacing is maintained ensures that the first spacing 1018 does not become too small, despite the gradients indicating that the third port 1012 should be moved up towards the second port 1010.

Figure 10D:
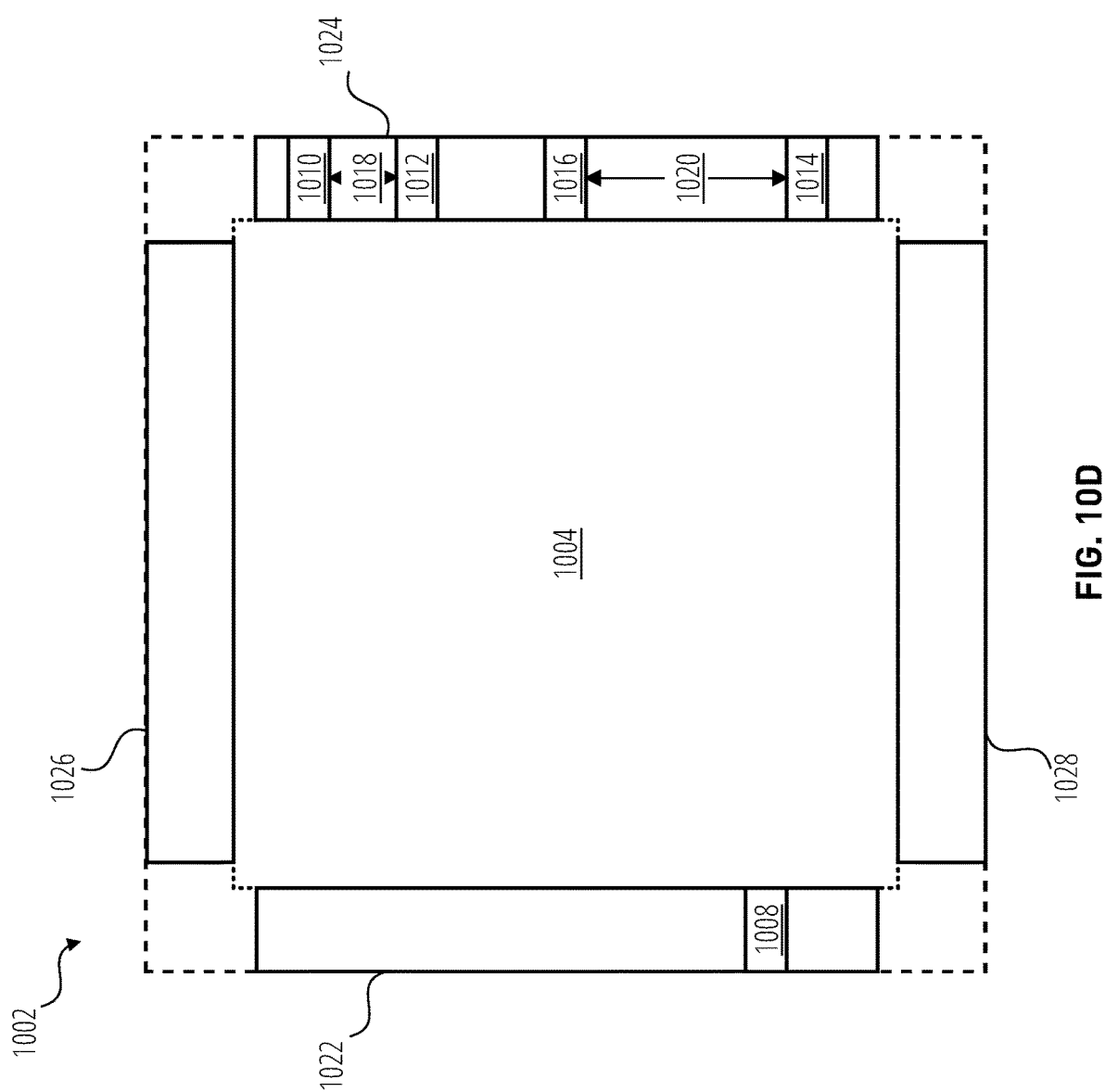

In FIG. 10D, two additional optimizations are noted. First, the location of the first port 1008 is moved down. The gradient of the overall performance may indicate that the output performance will be improved by the movement of the input port (e.g., the first port 1008), which may lead to this change. Second, the location of the fourth port 1014 and the fifth port 1016 are swapped. As discussed above, each location for a port may be associated with monitor locations that measure performance for both that port and for other ports. Accordingly, the illustrated location of the fifth port 1016 was associated with monitor locations for the desired performance of both the fourth port 1014 and the fifth port 1016 (as was the illustrated location of the fourth port 1014), and it was determined that overall performance would improve by swapping the locations of the ports.

Figure 10E:
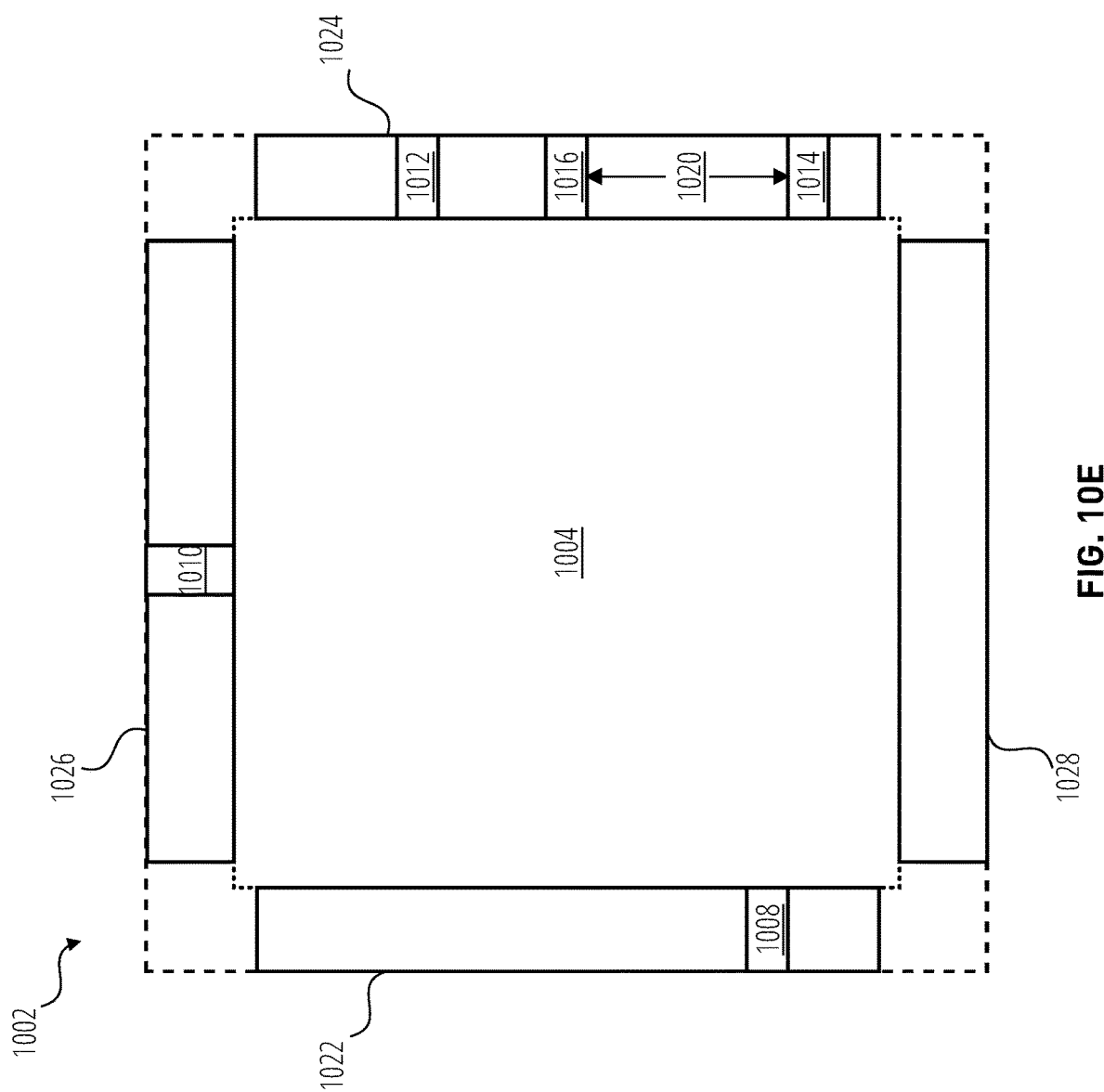

In FIG. 10E, an embodiment is illustrated wherein the locations of the ports are not confined to their original sides. In this embodiment, additional monitor locations were established on the third side 1026 and the fourth side 1028, and it was determined that the performance for the second port 1010 would be improved by moving the second port 1010 to the third side 1026.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, causes the computing system to perform actions for creating a design for a physical device, the actions comprising:
   receiving, by the computing system, a design specification, wherein the design specification includes a design region, one or more ports, and a port location perimeter;
   determining, by the computing system, an initial proposed design based on the design specification that includes the design region and a location for each port of the one or more ports within the port location perimeter;
   optimizing, by the computing system, the design region of the initial proposed design to create an improved design region;
   optimizing, by the computing system, at least one location of a port of the one or more ports within the port location perimeter to create an improved proposed design; and
   transmitting, by the computing system, the improved proposed design to a fabrication system to control the fabrication system to fabricate the physical device;
   wherein the optimizing at least one location of a port of the one or more ports within the port location perimeter includes:
      determining one or more monitor locations at points associated with the port location perimeter;
      conducting an operational simulation of the physical device based on the improved design region and the locations for each port within the port location perimeter;
      determining a gradient of a loss function at the one or more monitor locations; and
      updating at least one location of a port of the one or more ports based on the gradient of the loss function at the one or more monitor locations.

2. The non-transitory computer-readable medium of claim 1, wherein the actions further comprise:
   repeating at least one of the optimizing the design region and the optimizing at least one location of a port of the one or more ports within the port location perimeter to further improve the proposed design.

3. The non-transitory computer-readable medium of claim 2, wherein the repeating at least one of the optimizing the design region and the optimizing at least one location of a port of the one or more ports within the port location perimeter to further improve the proposed design includes:
   performing the optimizing the at least one location of a port once for multiple repetitions of the optimizing of the design region.

4. The non-transitory computer-readable medium of claim 1, wherein the loss function includes a term for a desired performance of each port of the one or more ports.

5. The non-transitory computer-readable medium of claim 1, wherein the loss function includes a term based on a minimum port-to-port spacing.

6. The non-transitory computer-readable medium of claim 1, wherein the loss function includes a learning rate that decreases over time.

7. The non-transitory computer-readable medium of claim 1, wherein the one or more monitor locations include at least one monitor location associated with each location of a port.

8. The non-transitory computer-readable medium of claim 7, wherein the one or more monitor locations further include at least one monitor location not associated with a location of a port.

9. The non-transitory computer-readable medium of claim 8, wherein updating at least one location of a port of the one or more ports based on the gradient of the loss function at the one or more monitor locations includes swapping locations of at least two ports.

10. A computer-implemented method of creating a design for a physical device, the method comprising:
   receiving, by a computing system, a design specification, wherein the design specification includes a design region, one or more ports, and a port location perimeter;
   determining, by the computing system, an initial proposed design based on the design specification that includes the design region and a location for each port of the one or more ports within the port location perimeter;
   optimizing, by the computing system, the design region of the initial proposed design to create an improved design region;
   optimizing, by the computing system, at least one location of a port of the one or more ports within the port location perimeter to create an improved proposed design; and
   transmitting, by the computing system, the improved proposed design to a fabrication system to control the fabrication system to fabricate the physical device;
   wherein the optimizing at least one location of a port of the one or more ports within the port location perimeter includes:
      determining one or more monitor locations at points associated with the port location perimeter;
      conducting an operational simulation of the physical device based on the improved design region and the locations for each port within the port location perimeter;
      determining a gradient of a loss function at the one or more monitor locations; and
      updating at least one location of a port of the one or more ports based on the gradient of the loss function at the one or more monitor locations.

11. The computer-implemented method of claim 10, further comprising:
   repeating at least one of the optimizing the design region and the optimizing at least one location of a port of the one or more ports within the port location perimeter to further improve the proposed design.

12. The computer-implemented method of claim 11, wherein the repeating at least one of the optimizing the design region and the optimizing at least one location of a port of the one or more ports within the port location perimeter to further improve the proposed design includes:

performing the optimizing the at least one location of a port once for multiple repetitions of the optimizing of the design region.

13. The computer-implemented method of claim 10, wherein the loss function includes a term for a desired performance of each port of the one or more ports.

14. The computer-implemented method of claim 10, wherein the loss function includes a term based on a minimum port-to-port spacing.

15. The computer-implemented method of claim 10, wherein the loss function includes a learning rate that decreases over time.

16. The computer-implemented method of claim 10, wherein the one or more monitor locations include at least one monitor location associated with each location of a port.

17. The computer-implemented method of claim 16, wherein the one or more monitor locations further include at least one monitor location not associated with a location of a port.

18. The computer-implemented method of claim 17, wherein updating at least one location of a port of the one or more ports based on the gradient of the loss function at the one or more monitor locations includes swapping locations of at least two ports.

* * * * *